United States Patent
Park et al.

(10) Patent No.: US 9,999,053 B2
(45) Date of Patent: Jun. 12, 2018

(54) METHOD AND APPARATUS FOR CONFIGURING RESOURCES OF RANDOM ACCESS CHANNEL IN WIRELESS COMMUNICATION SYSTEM

(71) Applicant: ELECTRONICS AND TELECOMMUNICATIONS RESEARCH INSTITUTE, Daejeon (KR)

(72) Inventors: Jisoo Park, Daejeon (KR); Youn Ok Park, Daejeon (KR); Young Jo Bang, Daejeon (KR); Kyung Yeol Sohn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 105 days.

(21) Appl. No.: 14/952,412

(22) Filed: Nov. 25, 2015

(65) Prior Publication Data

US 2016/0150541 A1 May 26, 2016

(30) Foreign Application Priority Data

Nov. 25, 2014 (KR) ........................ 10-2014-0165649
Nov. 24, 2015 (KR) ........................ 10-2015-0165039

(51) Int. Cl.
*H04W 72/04* (2009.01)
*H04W 74/08* (2009.01)

(52) U.S. Cl.
CPC .... *H04W 72/0453* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 8,477,712 B2 | 7/2013 | Hao et al. | |
| 2009/0175161 A1 | 7/2009 | Yi et al. | |
| 2010/0074191 A1 | 3/2010 | Lee et al. | |
| 2010/0296451 A1* | 11/2010 | Li | H04W 74/006 370/328 |
| 2012/0026952 A1* | 2/2012 | Okubo | H04W 74/008 370/329 |

(Continued)

FOREIGN PATENT DOCUMENTS

| | | |
|---|---|---|
| KR | 10-2010-0113107 A | 10/2010 |
| KR | 2011-0047162 A | 5/2011 |
| WO | WO 2014-114001 A1 | 7/2014 |

OTHER PUBLICATIONS

3GPP TS36.211, "Physical channel and modulation," 3rd Generation Partnership Project; Technical Specification Group Radio Access Network; E-UTRAN (http://www.3gpp.org).

*Primary Examiner* — Awet Haile
(74) *Attorney, Agent, or Firm* — Rabin & Berdo, P.C.

(57) ABSTRACT

A base station of a wireless communication system determines an index of radio resource blocks to which a plurality of random access channels are allocated, and allocates the plurality of random access channels to locations of the determined index of the radio resource blocks such that the radio resource blocks of the plurality of random access channels have a symmetrical structure in available uplink radio resource blocks.

11 Claims, 25 Drawing Sheets

(56) References Cited

U.S. PATENT DOCUMENTS

| | | |
|---|---|---|
| 2012/0230216 A1 | 9/2012 | Park et al. |
| 2014/0355560 A1 | 12/2014 | Li et al. |
| 2015/0071134 A1 | 3/2015 | Li et al. |
| 2015/0078219 A1 | 3/2015 | Li et al. |
| 2015/0110086 A1 | 4/2015 | Li et al. |
| 2015/0373693 A1* | 12/2015 | Wang ................ H04W 72/0406 370/329 |

* cited by examiner

FIG. 1

| CP | Preamble sequence |

FIG. 7A $n_{PRB}^{RA} = N_{RB}^{UL} - 6$ | PRACH #1 ($f_{RA}= 1$)
$n_{PRB}^{RA} = N_{RB}^{UL} - 12$ | PRACH #3 ($f_{RA}= 3$)
$n_{PRB}^{RA} = N_{RB}^{UL} - 18$ | PRACH #5 ($f_{RA}= 5$)

$N_{RB}^{UL}$

⋮

$n_{PRB}^{RA}$ $n_{PRB}^{RA} = 12$ | PRACH #4 ($f_{RA}= 4$)
$n_{PRB}^{RA} = 6$ | PRACH #2 ($f_{RA}= 2$)
$n_{PRB}^{RA} = n_{PRB\ offset}^{RA} = 0$ | PRACH #0 ($f_{RA}= 0$)

FIG. 8A

| | |
|---|---|
| $n_{PRB}^{RA} = N_{RB}^{UL} - 6$ | PRACH #4 ($f_{RA}= 4$) |
| $n_{PRB}^{RA} = N_{RB}^{UL} - 12$ | PRACH #2 ($f_{RA}= 2$) |
| $n_{PRB}^{RA} = n_{PRB\ offset}^{RA}$ $= N_{RB}^{UL} - 18$ | PRACH #0 ($f_{RA}= 0$) |
| | ⋮ |
| $n_{PRB}^{RA} = 12$ | PRACH #1 ($f_{RA}= 1$) |
| $n_{PRB}^{RA} = 6$ | PRACH #3 ($f_{RA}= 3$) |
| $n_{PRB}^{RA} = 0$ | PRACH #5 ($f_{RA}= 5$) |

$N_{RB}^{UL}$

FIG. 13A $n_{PRB}^{RA} = n_{PRB\ offset}^{RA}$
$= N_{RB}^{UL} - 6$ | PRACH #0 ($f_{RA}$= 0)
$n_{PRB}^{RA} = N_{RB}^{UL} - 12$ | PRACH #2 ($f_{RA}$= 2)
$n_{PRB}^{RA} = N_{RB}^{UL} - 18$ | PRACH #4 ($f_{RA}$= 4)

$\vdots$ $n_{PRB}^{RA} = 12$ | PRACH #5 ($f_{RA}$= 5)
$n_{PRB}^{RA} = 6$ | PRACH #3 ($f_{RA}$= 3)
$n_{PRB}^{RA} = 0$ | PRACH #1 ($f_{RA}$= 1)

$N_{RB}^{UL}$

METHOD AND APPARATUS FOR CONFIGURING RESOURCES OF RANDOM ACCESS CHANNEL IN WIRELESS COMMUNICATION SYSTEM

CROSS-REFERENCE TO RELATED APPLICATION

This application claims priority to and the benefit of Korean Patent Application Nos. 10-2014-0165649, and 10-2015-0165039 filed in the Korean Intellectual Property Office on Nov. 25, 2014, and Nov. 24, 2015, the entire contents of which are incorporated herein by reference.

BACKGROUND OF THE INVENTION (a) Field of the Invention

The present invention relates to a method and apparatus for configuring resources of a random access channel in a wireless communication system, and more particularly to, a method and apparatus for configuring frequency domain resources of a random access channel in a wireless communication system.

(b) Description of the Related Art

In a wireless communication system, a random access process is performed between a terminal and a base station for initial timing synchronization and power control, uplink resource request, handover, etc.

A random access channel is used as an uplink control channel for transmitting/receiving a preamble between the terminal and the base station during the random access process. The uplink control channel allocated to a radio frame in order to transmit the preamble for the purpose of random access is the random access channel. The random access channel is referred to as a PRACH (physical random access channel).

When a transmission mode of the wireless communication system is a TDD (time division duplex) method, a plurality of PRACHs may be allocated to uplink subframes according to uplink and downlink frame configurations. In this regard, when a PRACH configuration density is not multiplexed through a subframe index in a single uplink subframe that is a time domain due to lack in time domain resources including uplink subframes, on the assumption that PRACHs are not overlapped, a plurality of PRACHs may be multiplexed and included on a frequency domain.

When the plurality of PRACHs are included on the frequency domain, radio resources blocks to which the plurality of PRACHs are allocated are determined. In this regard, there is a need for an effective method of determining the radio resource blocks to which the plurality of PRACHs are to be allocated. For example, radio resource block holes having a small size may be generated according to a layout of a plurality of PRACHs in available radio resource blocks. If the radio resource block holes are generated, since PRACHs may not be continuously allocated to the radio resource blocks in a data traffic transmission, it is difficult to efficiently operate radio resources. In addition, in a case of PRACHs having the same number as that of adjacent cells and having the same TDD frame structure, interference between the PRACHs of the adjacent cells may occur, and accordingly, the terminal may fail random access.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for configuring resources of a random access channel in a wireless communication system having advantages of efficiently operating available radio resource blocks in the wireless communication system and increasing a random access success probability.

An exemplary embodiment of the present invention provides method of configuring frequency domain resources of a random access channel in a base station of a wireless communication system. The method includes determining an index of radio resource blocks to which a plurality of random access channels are allocated such that the radio resource blocks of the plurality of random access channels are symmetrical to each other in available uplink radio resource blocks; and allocating the plurality of random access channels to locations corresponding to the determined index of the radio resource blocks.

The determining may include determining an indicator value indicating a location of an offset value designating a location of a first random access channel among the plurality of random access channels; and calculating the index of the radio resource blocks to which the plurality of random access channels are allocated by using the offset value, the indicator value, and a frequency resource index of each of the plurality of random access channels.

The indicator value may indicate whether the offset value is in an upper region or a lower region in relation to a center radio resource block among the available uplink radio resource blocks.

The indicator value may have a value of 1 or −1 according to a location of the offset value.

The calculating of the index of the radio resource blocks to which the plurality of random access channels are allocated may use an equation, wherein the equation is wherein floor(x) returns a largest integer among integers smaller than or equal to a parameter x, $f_{RA}$ denotes a frequency resource index of random access channels, $N_{RB}^{RA}$ denotes the number of radio resource blocks occupied by one random access channel, $n_{PRBoffset}^{RA}$ denotes the offset value, $R_{PRBoffset}^{RA}$ denotes the indicator value, and $n_{PRB}^{RA}$ denotes the index of the radio resource blocks to which the plurality of random access channels are allocated.

The indicator value may be 1 when a location of the offset value is in an upper region in relation to a center radio resource block among the available uplink radio resource blocks, and may be −1 when the location of the offset value is in a lower region in relation to the center radio resource block.

The determining may further include receiving the offset value from an upper layer.

The method may further include when random access channels having the same number as that of adjacent cells are configured and have the same frame structure, differently allocating the plurality of random access channels in the adjacent cells and a time domain.

Another embodiment of the present invention provides an apparatus for configuring frequency domain resources of a random access channel in a wireless communication system. The apparatus for configuring frequency domain resources of the random access channel may include a processor and a transceiver. The processor may determine radio resource blocks to which a plurality of random access channels are allocated such that the radio resource blocks of the plurality of random access channels are symmetrical to each other in relation to a center radio resource block in available uplink radio resource blocks. The transceiver may transmit resource configuration information of the plurality of random access channels to all terminals included in a cell.

The processor may determine the index of the radio resource blocks to which the plurality of random access channels are allocated by using an offset value designating a location of a first random access channel among the plurality of random access channels, an indicator value indicating a location of the offset value, and a frequency resource index of each of the plurality of random access channels.

The indicator value may have a value of 1 or −1 according to whether the offset value is in an upper region or a lower region in relation to the center radio resource block among the available uplink radio resource blocks.

When random access channels having the same number as that of adjacent cells are configured and have the same frame structure, the processor may differently allocate the plurality of random access channels in the adjacent cells and a time domain.

Locations of the plurality of random access channels in a time domain may include a first indicator, a second indicator, and a third indicator, wherein the first indicator indicates one of each radio frame, an even radio frame, and an odd radio frame, the second indicator indicates a front part of a half frame or a back part of the half frame, and the third indicator indicates a subframe index at which a random access preamble starts.

BRIEF DESCRIPTION OF THE DRAWINGS

FIG. 1 is a view showing an example of a format of an OFDM (Orthogonal Frequency Division Multiplexing)-based random access preamble in a wireless communication system according to an exemplary embodiment of the present invention.

FIGS. 7A through 7C are views showing examples of allocating PRACHs to uplink subframes when a PRACH frequency offset value is in a lower region within an available uplink channel frequency band range according to Equation 1 in an LTE TDD mode according to an exemplary embodiment of the present invention.

FIGS. 8A through 8C are views showing examples of allocating PRACHs to uplink subframes when a PRACH frequency offset value is in an upper region within an available uplink channel frequency band range in an LTE TDD mode according to an exemplary embodiment of the present invention.

FIGS. 13A through 13C are views showing examples of allocating PRACHs to uplink subframes according to Equation 2 when a PRACH frequency offset value is in an upper region within an uplink channel frequency band range in an LTE TDD mode according to an exemplary embodiment of the present invention.

DETAILED DESCRIPTION OF THE EMBODIMENTS

Figure 2:
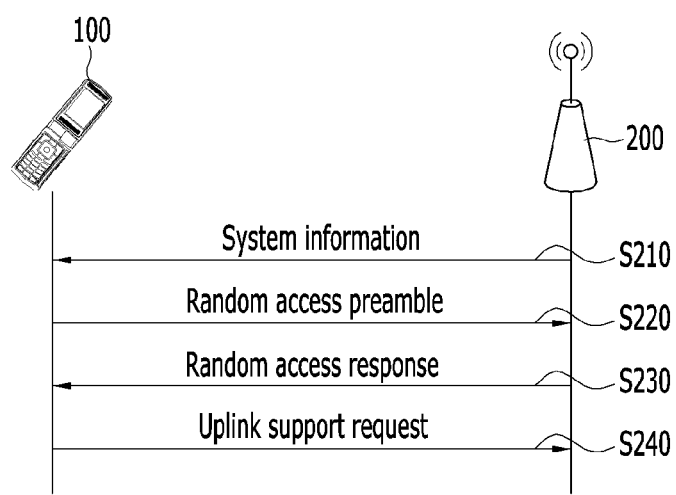
FIG. 2 is a view showing a random access process according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, throughout the specification and the claims, unless explicitly described to the contrary, the word "comprise" and variations such as "comprises" or "comprising", will be understood to imply the inclusion of stated elements but not the exclusion of any other elements.

Throughout the present specification, a terminal may be referred to as a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), or the like, and may include all or some of functions of the MT, the MS, the AMS, the HR-MS, the SS, the PSS, the AT, the UE, or the like.

In addition, the base station (BS) may be referred to as an advanced base station (ABS), a high reliability base station (HR-BS), a node B, an evolved node B (eNodeB), an access point (AP), a radio access station (RAS), a base transceiver station (BTS), an MMR (mobile multihop relay)-BS, a relay station (RS) functioning the base station, a relay node (RN) functioning the base station, an advanced relay station (ARS) functioning the base station, a high reliability relay station, HR-RS) functioning the base station, a small base station [a femoto BS, a home node B (HNB), a home eNodeB (HeNB), a pico BS, a metro BS, a micro BS, etc.], etc. and may include all or some of functions of the ABS, the nodeB, the eNodeB, the AP, the RAS, the BTS, the MMR-BS, the RS, the RN, the ARS, the HR-RS, the small base station, or the like.

The base station may be referred to as a macro cell base station, a remote radio head (RRH) cell base station, a pico cell base station, a micro cell base station, a femto cell base station, or the like according to a form of a cell.

Hereinafter, a method and apparatus for configuring resources of a random access channel in a wireless communication system according to an exemplary embodiment of the present invention will be described with reference to the accompanying drawings.

Figure 1:
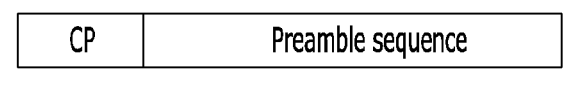

FIG. 1 is a view showing an example of a format of an OFDM (Orthogonal Frequency Division Multiplexing)-based random access preamble in a wireless communication system according to an exemplary embodiment of the present invention.

Referring to FIG. 1, a random access preamble is configured as a cyclic prefix (hereinafter referred to as CP) and a preamble sequence.

A length of the CP or a length of the preamble sequence is defined according to a shape of a radio frame or an attribute of a cell that is to be configured. In the 3GPP, a format of a random access preamble is configured by using one of five formats determined in the standard TS36.211.

The base station transfers channel configuration information of a PRACH that is a random access channel for each of cells to all terminals located in the cells through a broadcasting channel.

FIG. 2 is a view showing a random access process according to an exemplary embodiment of the present invention.

Referring to FIG. 2, a terminal 100 obtains synchronization from a base station 200 through a PSS (Primary Synchronization Signal)/SSS (Second Synchronization Signal) and receives system information through a broadcasting channel (BCH) (S210). The system information transmitted through the BCH includes parameters for generating the random access preamble.

The terminal 100 transmits the random access preamble to the base station 200 (S220). The terminal 100 selects one preamble sequence that is to be used as the random access preamble from among various selectable preamble sequences and generates and transmits a random access preamble using the selected preamble sequence to the base station 200.

The base station 200 detects the received random access preamble and estimates transmission timing of the terminal 100 for each of random access preamble indexes in order to accord to uplink synchronization necessary for data transmission between the terminal 100 and the base station 200. Thereafter, the base station 200 transmits a random access response corresponding to an access acknowledgement message including TA (timing advanced) information necessary for the uplink synchronization to the terminal 100 based on the random access preamble detected by the base station 200 (S230).

The terminal 100 adjusts uplink timing based on the received random access response and then requests necessary uplink radio resources to the base station 200 through determined uplink radio resources (S240).

To perform such a random access process, a PRACH that suitably configures a random access preamble transmission opportunity of a time domain and a radio resource location of a frequency domain in transmitting/receiving the random access preamble in a radio frame or a subframe is defined.

Figure 3:
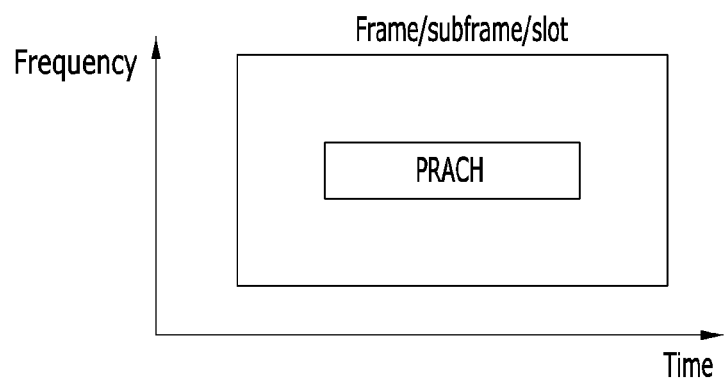
FIG. 3 is a view showing an example of a PRACH resource configuration in a wireless communication system according to an exemplary embodiment of the present invention.

FIG. 3 is a view showing an example of a PRACH resource configuration in a wireless communication system according to an exemplary embodiment of the present invention.

Referring to FIG. 3, a PRACH uses time and a frequency as radio resources. One PRACH is located in an arbitrary frequency resource at every frame, at every subframe, or at every slot.

One frame includes a plurality of subframes. One subframe includes a plurality of slots. A slot includes a plurality of symbols in a time domain and includes a plurality of resource blocks in a frequency domain. In one resource block (RB), a frequency resource may include a plurality of subcarriers, and a time resource may include one symbol. For example, in an example of the OFDM transmission method, when the RB configured as k subcarriers and l symbol is a unit, one PRACH may be configured as N RBs.

Figure 4:
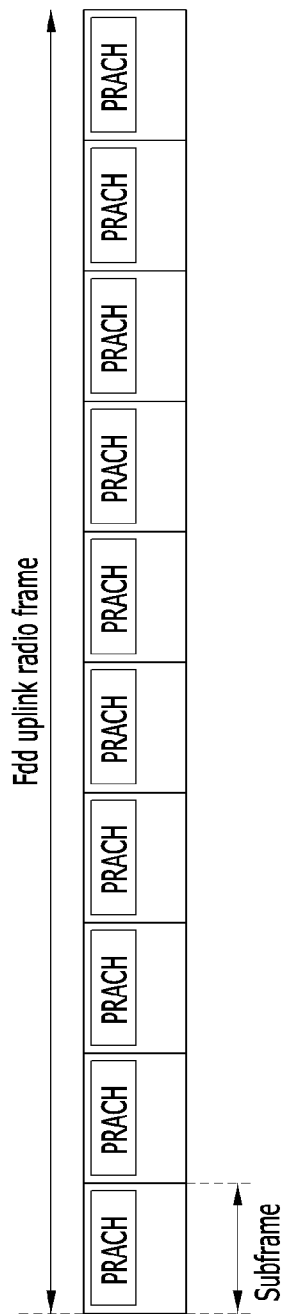
FIG. 4 is a view showing an example of a PRACH resource configuration of an FDD (frequency division duplex) uplink radio frame in a wireless communication system according to an exemplary embodiment of the present invention.
Figure 5:
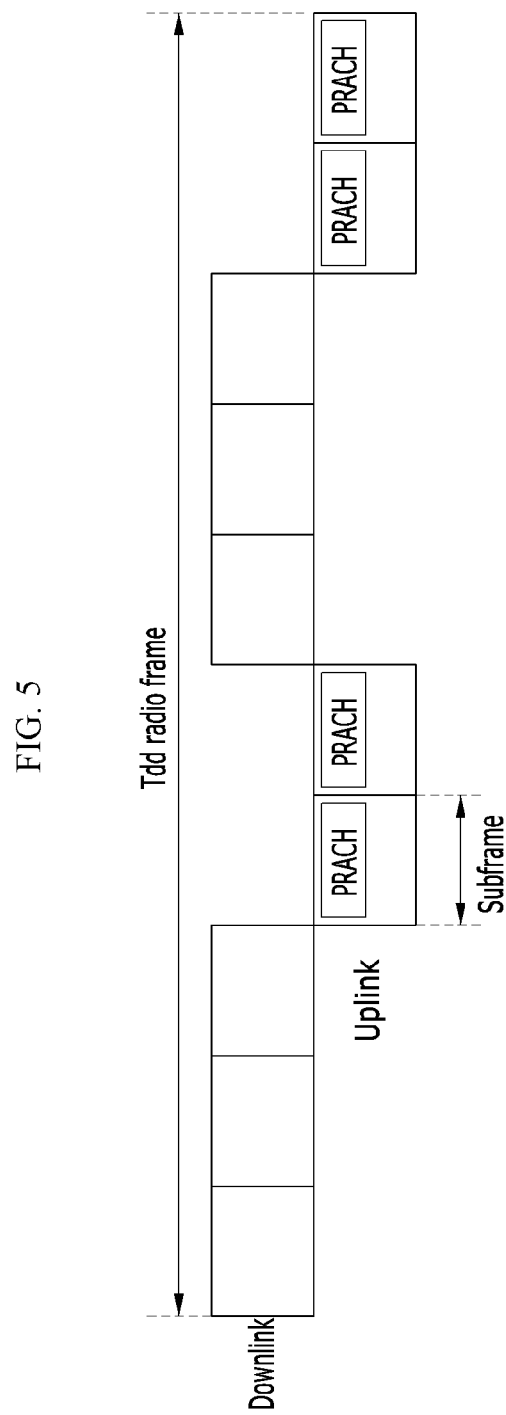
FIG. 5 is a view showing an example of a PRACH resource configuration of a TDD (time division duplex) radio frame in a wireless communication system according to an exemplary embodiment of the present invention.

FIG. 4 is a view showing an example of a PRACH resource configuration of an FDD (frequency division duplex) uplink radio frame in a wireless communication system according to an exemplary embodiment of the present invention. FIG. 5 is a view showing an example of a PRACH resource configuration of a TDD (time division duplex) radio frame in a wireless communication system according to an exemplary embodiment of the present invention.

Referring to FIGS. 4 and 5, a transmission mode of the wireless communication system includes an FDD mode and a TDD mode. The FDD mode is multiplexed transmission/reception resources of uplink and downlink by frequencies and supports communication of uplink and downlink. The TDD mode is multiplexed transmission/reception resources of uplink and downlink by time and supports communication of uplink and downlink.

Referring to FIG. 4, since the FDD method is multiplexed in frequency domain, the FDD uplink radio frame may be configured as uplink subframes that are all subframes configuring one radio frame. One PRACH may be configured for each uplink subframe of the FDD uplink radio frame.

Meanwhile, referring to FIG. 5, since the TDD mode is multiplexed in time domain, the TDD uplink radio frame may be configured as uplink subframes and downlink subframes. The number of uplink subframes and the number of downlink subframes may be the same or may be different. One PRACH may be configured for each uplink subframe of the TDD radio frame. One PRACH may be configured for each uplink subframe of the TDD radio frame.

Table 1 and Table 2 show PRACH configurations with respect to a preamble format 0 of a random access preamble in LTE (Long Term Evolution) FDD and TDD modes.

TABLE 1

| PRACH Configuration Index | Preamble Format | System frame number | Subframe number | Version $R_{RA}$ |
|---|---|---|---|---|
| 0 | 0 | Even | 1 | 0 |
| 1 | 0 | Even | 4 | 1 |
| 2 | 0 | Even | 7 | 2 |

TABLE 1-continued

| PRACH Configuration Index | Preamble Format | System frame number | Subframe number | Version $R_{RA}$ |
|---|---|---|---|---|
| 3 | 0 | Any | 1 | 0 |
| 4 | 0 | Any | 4 | 1 |
| 5 | 0 | Any | 7 | 2 |
| 6 | 0 | Any | 1, 6 | 0 |
| 7 | 0 | Any | 2, 7 | 1 |
| 8 | 0 | Any | 3, 8 | 2 |
| 9 | 0 | Any | 1, 4, 7 | 0 |
| 10 | 0 | Any | 2, 5, 8 | 1 |
| 11 | 0 | Any | 3, 6, 9 | 2 |
| 12 | 0 | Any | 0, 2, 4, 6, 8 | 0 |
| 13 | 0 | Any | 1, 3, 5, 7, 9 | 1 |
| 14 | 0 | Any | 0, 1, 2, 3, 4, 5, 6, 7, 8, 9 | 0 |

As shown in Table 1 above, a method of configuring a RPACH in the LTE FDD mode designates a location of a random access preamble transmission opportunity through a given RPACH setting, like a RPACH configuration index list. Preamble formats classified into various types according to preamble sequence lengths, a system frame number, and a subframe number that are time domain locations indicating transmission opportunities for transmitting random access preambles correspond to a PRACH configuration index as one parameter set. The system frame number indicates an even number, an odd number, or any of them.

Frequency domain locations of PRACH radio resources of a frame may be identical with respect to all PRACHs and may be in a unifying manner configured in a base station. Such a PRACH configuration index and the frequency domain locations of the RPACH radio resources are transferred to a terminal through a BCH, i.e., a system information broadcasting message.

TABLE 2

| PRACH configuration Index | Preamble Format | Density Per 10 ms $D_{RA}$ | Version $R_{RA}$ |
|---|---|---|---|
| 0 | 0 | 0.5 | 0 |
| 1 | 0 | 0.5 | 1 |
| 2 | 0 | 0.5 | 2 |
| 3 | 0 | 1 | 0 |
| 4 | 0 | 1 | 1 |
| 5 | 0 | 1 | 2 |
| 6 | 0 | 2 | 0 |
| 7 | 0 | 2 | 1 |
| 8 | 0 | 2 | 2 |
| 9 | 0 | 3 | 0 |
| 10 | 0 | 3 | 1 |
| 11 | 0 | 3 | 2 |
| 12 | 0 | 4 | 0 |
| 13 | 0 | 4 | 1 |
| 14 | 0 | 4 | 2 |
| 15 | 0 | 5 | 0 |
| 16 | 0 | 5 | 1 |
| 17 | 0 | 5 | 2 |
| 18 | 0 | 6 | 0 |
| 19 | 0 | 6 | 1 |

Unlike the FDD mode, in the TDD mode, a PRACH configuration density $D_{RA}$ and a PRACH configuration version $R_{RA}$ correspond to the PRACH configuration index as one parameter set according to a frame structure and a preamble format. In this regard, $D_{RA}$ denotes the number of PRACH channels for each TDD radio frame, and $R_{RA}$ denotes a version number of some different mapping methods of a time domain and is an index for differentiating a location of a time domain of a PRACH between adjacent cells. Such a PRACH configuration index is transferred to the terminal through the BCH, i.e., the system information broadcasting message.

Figure 6:
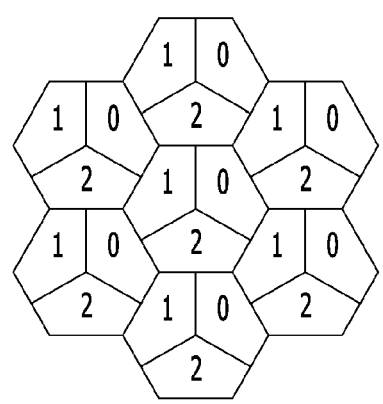
FIG. 6 is a view showing PRACH multiplexing of Tables 1 and 2 using a PRACH configuration version in PRACH channel configurations of adjacent different cells.

FIG. 6 is a view showing PRACH multiplexing of Tables 1 and 2 using a PRACH configuration version in PRACH channel configurations of adjacent different cells.

Referring to FIG. 6, different $R_{RA}$ are allocated to adjacent cells. That is, a location of a time domain of a PRACH between the adjacent cells is different.

In a TDD mode, a plurality of PRACH resources may be allocated to uplink subframes according to a frame configuration. PRACH channel mapping may be performed through configuration methods of a time domain and a frequency domain. In this regard, when $D_{RA}$ is not multiplexed through a subframe index (number) in a single uplink subframe that is the time domain due to lack in time domain resources, on the assumption that PRACHs are not overlapped, a plurality of PRACHs may be multiplexed and included on the frequency domain.

That is, time domain multiplexing is preferentially applied to random access resources according to a PRACH configuration setting, and, when the PRACH resources are not allocated without overlapping with the time domain with respect to the given $D_{RA}$, frequency domain multiplexing is additionally utilized besides the time domain multiplexing.

A method of determining an RB index $n_{PRB}^{RA}$ to which PRACHs are allocated for the frequency domain multiplexing of the PRACHs in the LTE TDD mode is determined according to Equation 1.

$$n_{PRB}^{RA} = \begin{cases} n_{PRBoffset}^{RA} + 6\left\lfloor \frac{f_{RA}}{2} \right\rfloor, & \text{if } f_{RA} \bmod 2 = 0 \\ N_{RB}^{UL} - 6 - n_{PRBoffset}^{RA} - 6\left\lfloor \frac{f_{RA}}{2} \right\rfloor, & \text{otherwise} \end{cases} \quad \text{(Equation 1)}$$

In this regard, $N_{RB}^{UL}$ denotes the number of available uplink RBs, $n_{PRBoffset}^{RA}$ denotes a PRACH frequency offset and indicates a location of a first random access channel among a plurality of random access channels, and means the RB index notified by an upper layer for PRACH transmission. $f_{RA}$ denotes a frequency resource index of PRACHs. A maximum value of $f_{RA}$ is determined according to a channel number of all PRACHs allocated to random access preamble transmission opportunities of the corresponding time domain. $\lfloor x \rfloor$ denotes a floor operation and outputs a largest integer among integers smaller than or equal to a parameter x.

The number of RBs occupied by each random access preamble, i.e. occupied by one PRACH, in the LTE is 6.

Figure 7B:
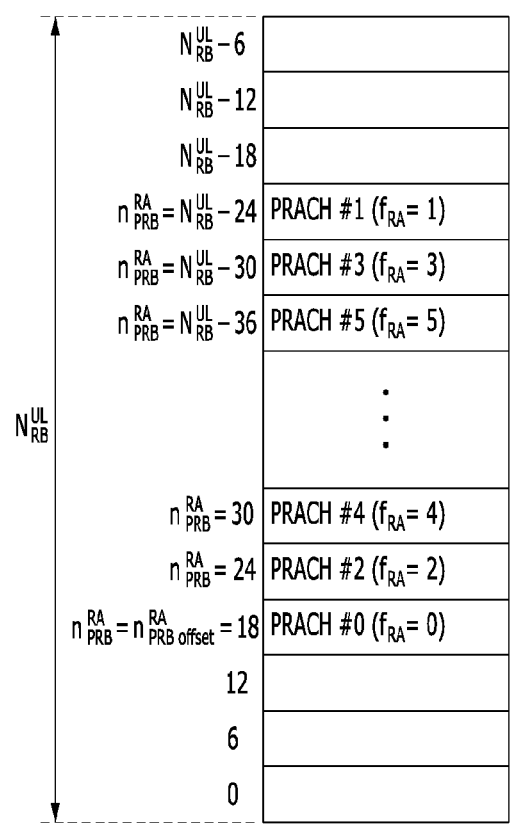
Figure 7C:
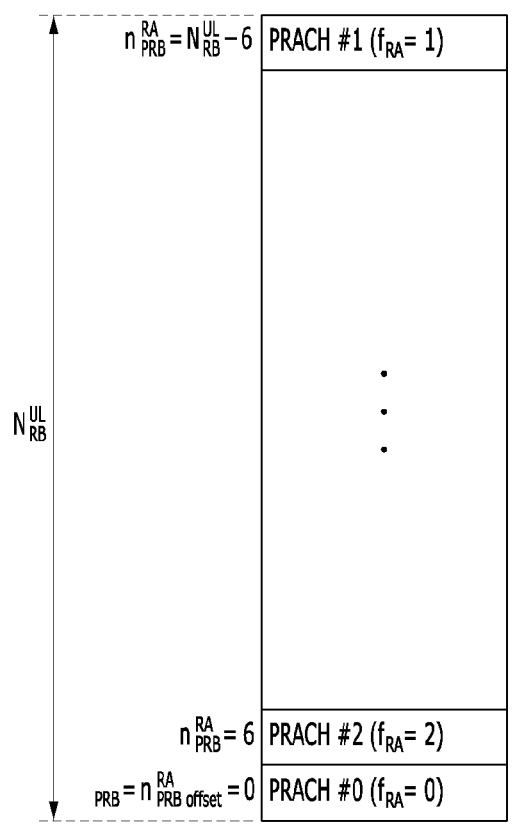

FIGS. 7A through 7C are views showing examples of allocating PRACHs to uplink subframes when a value of $n_{PRBoffset}^{RA}$ is in a lower region within an available uplink channel frequency band range according to Equation 1 in an LTE TDD mode according to an exemplary embodiment of the present invention.

FIG. 7A shows a case where an offset value designating a location of a first PRACH is $n_{PRBoffset}^{RA}=0$ ($f_{RA}=0$), and a maximum number of available PRACHs is 6, and thus shows a layout structure of PRACHs when $f_{RA}$ is 0, 1, 2, 3, 4, 5.

As shown in FIG. 7A, according to Equation 1, PRACH #0 having 0 as an index of $f_{RA}$ is allocated to the lowermost location corresponding to an RB index 0 in a frequency domain corresponding to $N_{RB}^{UL}$, and PRACH #1 having 1 as the index of $f_{RA}$ is allocated to the uppermost location corresponding to an RB index $N_{RB}^{UL}-6$. PRACH #2 having 2 as the index of $f_{RA}$ is allocated to a location corresponding to an RB index 6, and PRACH #3 having 3 as the index of $f_{RA}$ is allocated to a location corresponding to an RB index $N_{RB}^{UL}=12$. PRACH #4 having 4 as the index of $f_{RA}$ is allocated to a location corresponding to an RB index 12, and PRACH #5 having 5 as the index of $f_{RA}$ is allocated to a location corresponding to an RB index $N_{RB}^{UL}-18$. In doing so, RB locations to which PRACHs are allocated according to the index of $f_{RA}$ are symmetrical to each other in relation to a center RB.

FIG. 7B shows a case where $n_{PRBoffset}^{RA}=18$ ($f_{RA}=0$) and a maximum number of available PRACHs is 6, and thus shows a layout structure of PRACHs when $f_{RA}$ is 0, 1, 2, 3, 4, 5.

As shown in FIG. 7B, according to Equation 1, PRACH #0 having 0 as the index of $f_{RA}$ is allocated to a location corresponding to an RB index 18 in the frequency domain corresponding to $N_{RB}^{UL}$, and PRACH #1 having 1 as the index of $f_{RA}$ is allocated to a location corresponding to an RB index $N_{RB}^{UL}-24$. PRACH #2 having 2 as the index of $f_{RA}$ is allocated to a location corresponding to an RB index 24, and PRACH #3 having 3 as the index of $f_{RA}$ is allocated to a location corresponding to an RB index $N_{RB}^{UL}-30$. PRACH #4 having 4 as the index of $f_{RA}$ is allocated to a location corresponding to an RB index 30, and PRACH #5 having 5 as the index of $f_{RA}$ is allocated to a location corresponding to an RB index $N_{RB}^{UL}-36$ In doing so, RB locations to which PRACHs are allocated according to the index of $f_{RA}$ are symmetrical to each other in relation to the center RB.

FIG. 7C shows a case where $n_{PRBoffset}^{RA}=N_{RB}^{UL}-12$ ($f_{RA}=0$) and a maximum number of available PRACHs is 6 while a maximum value of $f_{RA}$ is 2, and thus shows a layout structure of PRACHs when $f_{RA}$ is 0, 1, 2.

According to Equation 1, since $n_{PRB}^{RA}$ of the first PRACH is 0, PRACH #0 having 0 as the index of $f_{RA}$ is allocated to the lowermost location corresponding to the RB index 0 in the frequency domain corresponding to $N_{RB}^{UL}$. According to Equation 1, PRACH #1 having 1 as the index of $f_{RA}$ is allocated to the uppermost location corresponding to the RB index $N_{RB}^{UL}-6$ and PRACH #2 having 2 as the index of $f_{RA}$ is allocated to a location corresponding to the RB index 6

Figure 8B:
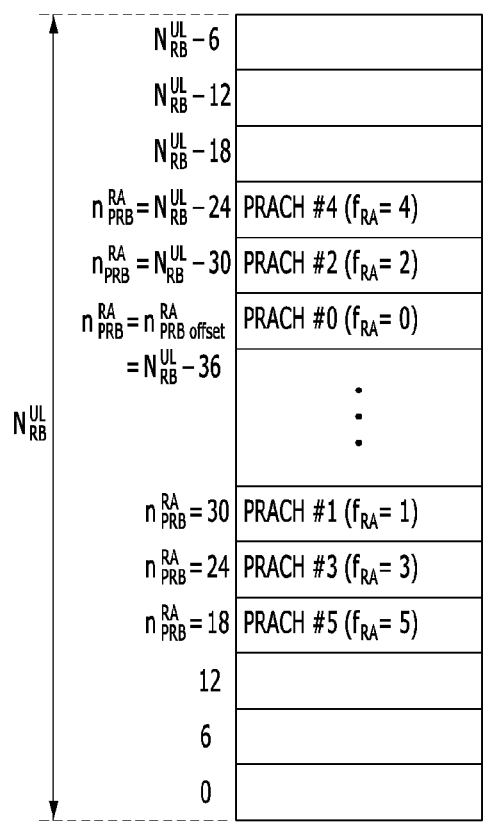
Figure 8C:
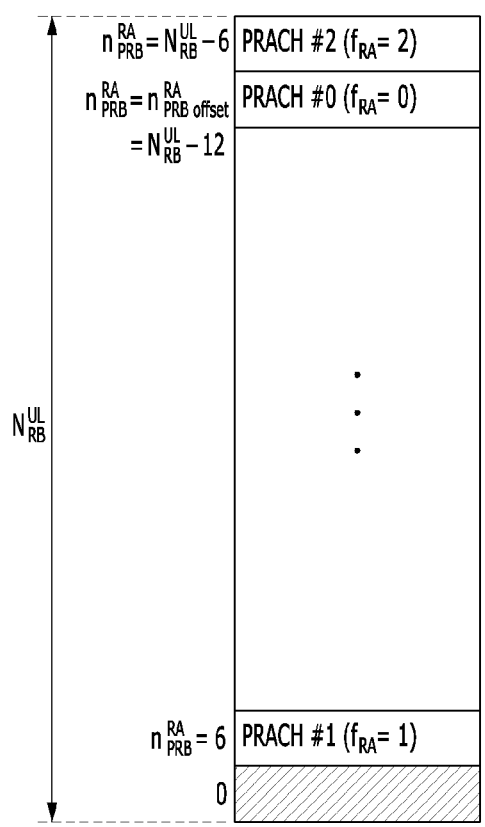

FIGS. 8A through 8C are views showing examples of allocating PRACHs to uplink subframes when a value of $n_{PRBoffset}^{RA}$ is in an upper region within an available uplink channel frequency band range in an LTE TDD mode according to an exemplary embodiment of the present invention.

FIG. 8A shows a case where an offset value designating a location of a first PRACH is $n_{PRBoffset}^{RA}=N_{RB}^{UL}-18$ ($f_{RA}=0$), and a maximum number of available PRACHs is 6, and thus shows a layout structure of PRACHs when $f_{RA}$ is 0, 1, 2, 3, 4, 5.

As shown in FIG. 8A, according to Equation 1, PRACH #0 having 0 as an index of $f_{RA}$ is allocated to a location corresponding to an RB index $N_{RB}^{UL}-18$ in a frequency domain corresponding to $N_{RB}^{UL}$ and PRACH #1 having 1 as the index of $f_{RA}$ is allocated to a location corresponding to an RB index 12. PRACH #2 having 2 as the index of $f_{RA}$ is allocated to a location corresponding to an RB index $N_{RB}^{UL}-12$ and PRACH #3 having 3 as the index of $f_{RA}$ is allocated to a location corresponding to an RB index 6. PRACH #4 having 4 as the index of $f_{RA}$ is allocated to the uppermost location corresponding to an RB index $N_{RB}^{UL}-6$, and PRACH #5 having 5 as the index of $f_{RA}$ is allocated to the lowermost location corresponding to an RB index 0. In doing so, RB locations to which PRACHs are allocated according to the index of $f_{RA}$ are symmetrical to each other in relation to a center RB.

FIG. 8B shows a case where $n_{PRBoffset}^{RA}=N_{RB}^{UL}-36$ ($f_{RA}=0$) and a maximum number of available PRACHs is 6, and thus shows a layout structure of PRACHs when $f_{RA}$ is 0, 1, 2, 3, 4, 5.

As shown in FIG. 8B, according to Equation 1, PRACH #0 having 0 as the index of $f_{RA}$ is allocated to a location corresponding to an RB index $N_{RB}^{UL}-36$ in the frequency domain corresponding to $N_{RB}^{UL}$, and PRACH #1 having 1 as the index of $f_{RA}$ is allocated to a location corresponding to an RB index 30 according to Equation 1. PRACH #2 having 2 as the index of $f_{RA}$ is allocated to a location corresponding to an RB index $N_{RB}^{UL}-30$, and PRACH #3 having 3 as the index of $f_{RA}$ is allocated to a location corresponding to an RB index 24. PRACH #4 having 4 as the index of $f_{RA}$ is allocated to a location corresponding to an RB index $N_{RB}^{UL}-24$ and PRACH #5 having 5 as the index of $f_{RA}$ is allocated to a location corresponding to an RB index 18. In doing so, RB locations to which PRACHs are allocated according to the index of $f_{RA}$ are symmetrical to each other in relation to the center RB.

FIG. 8C shows a case where $n_{PRBoffset}^{RA}=N_{RB}^{UL}-12$ ($f_{RA}=0$) and a maximum number of available PRACHs is 6 while a maximum value of $f_{RA}$ is 2, and thus shows a layout structure of PRACHs when $f_{RA}$ is 0, 1, 2.

As shown in FIG. 8C, according to Equation 1, PRACH #0 having 0 as the index of $f_{RA}$ is allocated to a location corresponding to the RB index $N_{RB}^{UL}-12$, PRACH #1 having 1 as the index of $f_{RA}$ is allocated to a location corresponding to the RB index 6, and PRACH #2 having 2 as the index of $f_{RA}$ is allocated to a location corresponding to the RB index $N_{RB}^{UL}-6$.

However, in FIG. 8C, RB holes having 0~5 as the RB index are generated. Since the RB holes are generated, there occurs a problem that radio resources may not be allocated continuously with RBs located upside in a data traffic transmission.

In addition, according to Equation 1, although the RB locations to which the PRACHs are allocated are partially symmetrical to each other in relation to the center RB, in cases where the value of is $n_{PRBoffset}^{RA}$ is in a lower region and an upper region, when the same number of PRACHs is configured, since the occupied RB locations are not symmetrical to each other according to the $f_{RA}$ index, it is not easy to assign and manage a PRACH configuration version of each cell.

Figure 9:
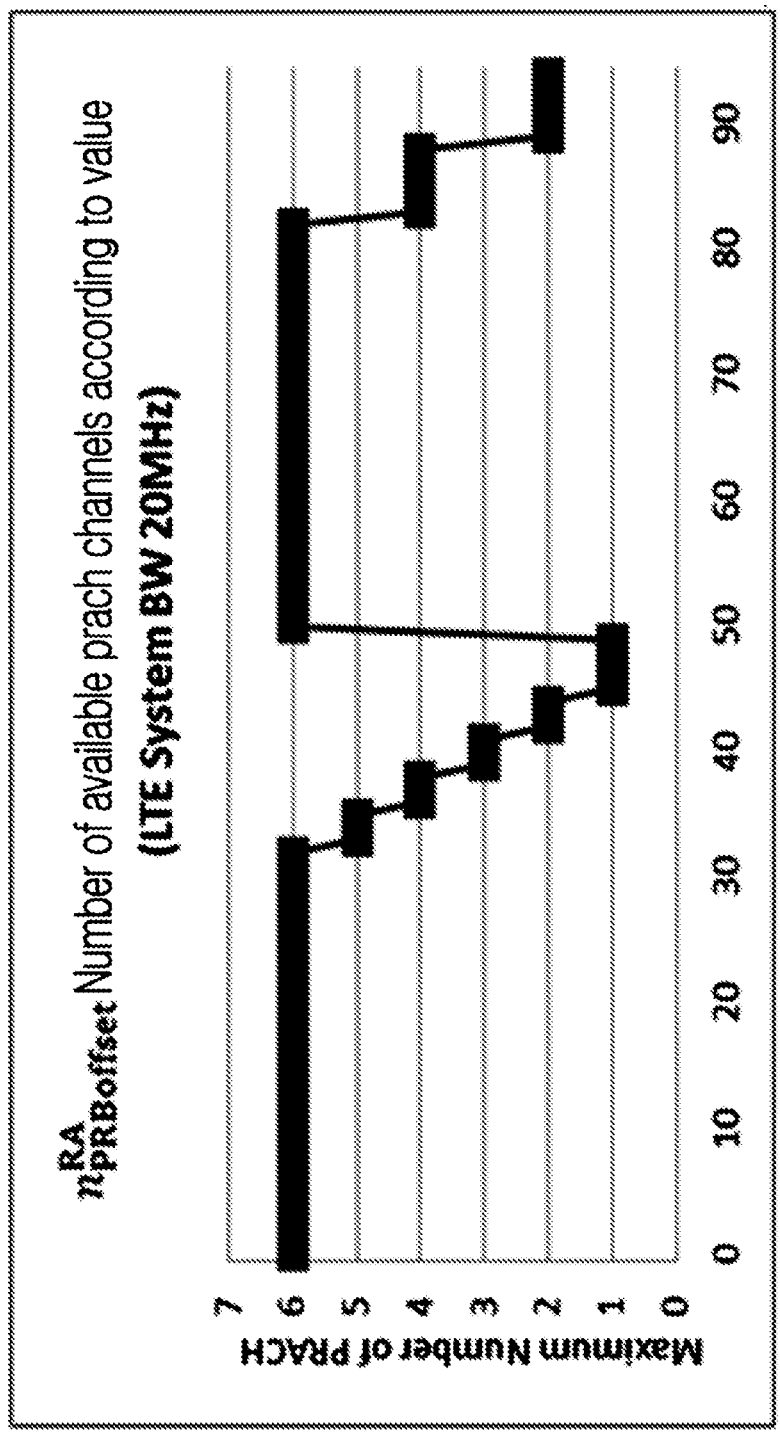
FIG. 9 is a view showing the number of available PRACHs with respect to a value of $n_{PRBoffset}^{RA}$ using Equation 1 when a system channel band is 20 MHz and $N_{RB}^{UL}$=100 in an LTE TDD mode.

FIG. 9 is a view showing the number of available PRACHs with respect to a value of $n_{PRBoffset}^{RA}$ using Equation 1 when a system channel band is 20 MHz and $N_{RB}^{UL}=100$ in an LTE TDD mode.

As shown in FIG. 9, in cases where a value of $n_{PRBoffset}^{RA}$ is in lower regions 0~49 and upper regions 50~99 of an RB index, there occurs problem that the number of available PRACHs has a non-symmetrical structure, and a case where the number of PRACHs is 3 ($f_{RA}=2$), 5($f_{RA}=4$) may not be used when the value of $n_{PRBoffset}^{RA}$ is in the upper regions.

Figure 10:
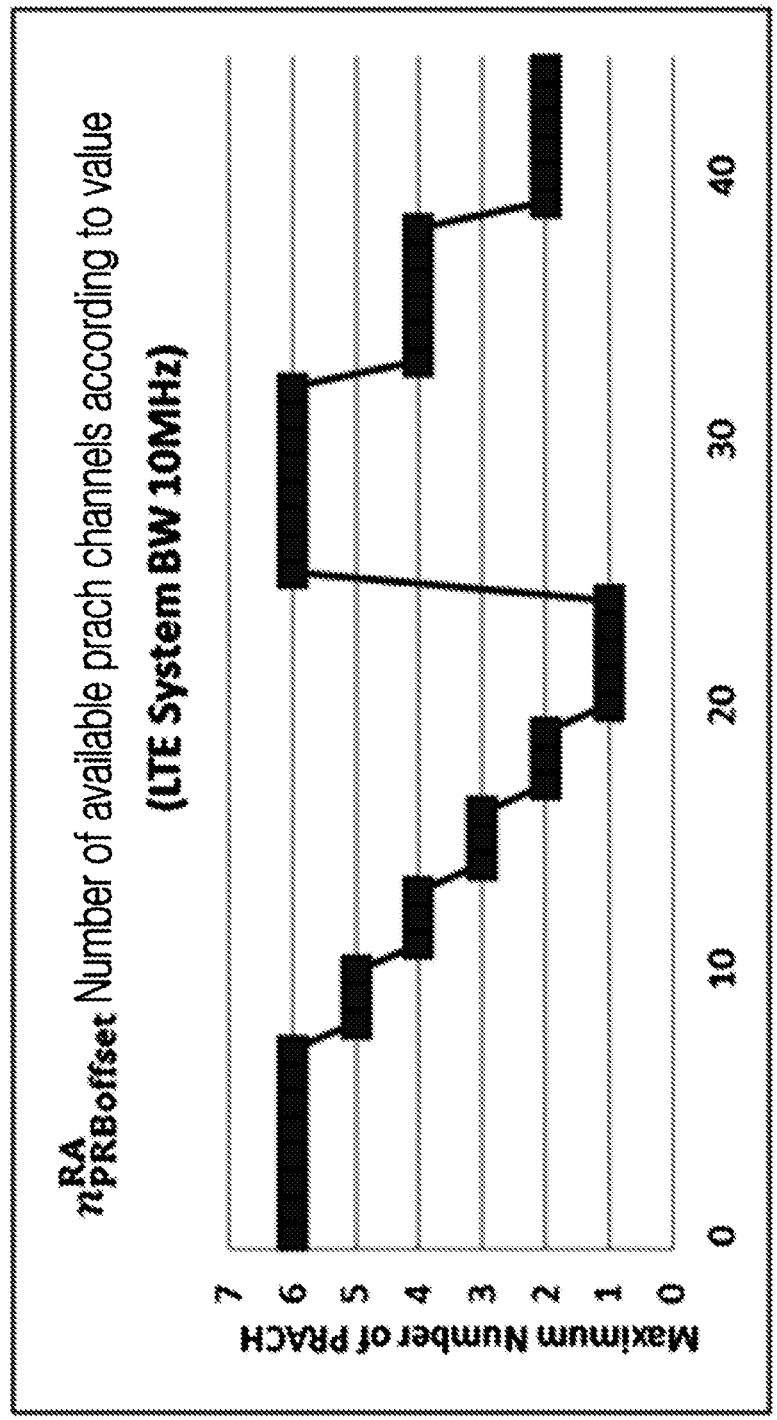
FIG. 10 is a view showing the number of available PRACHs with respect to a PRACH frequency offset value using Equation 1 when a system channel band is 10 MHz and $N_{RB}^{UL}$=50 in an LTE TDD mode.

FIG. 10 is a view showing the number of available PRACHs with respect to a value of $n_{PRBoffset}^{RA}$ using Equation 1 when a system channel band is 10 MHz and $N_{RB}^{UL}-50$ in an LTE TDD mode.

As shown in FIG. 10, in cases where the value of $n_{PRBoffset}^{RA}$ is in lower regions 0~24 and upper regions 25~49 of an RB index, there occurs problem that the number of available PRACHs has a non-symmetrical structure, and a case where the number of PRACHs is 3 ($f_{RA}=2$), 5($f_{RA}=4$) may not be used when the value of $n_{PRBoffset}^{RA}$ is in the upper regions.

Figure 11:
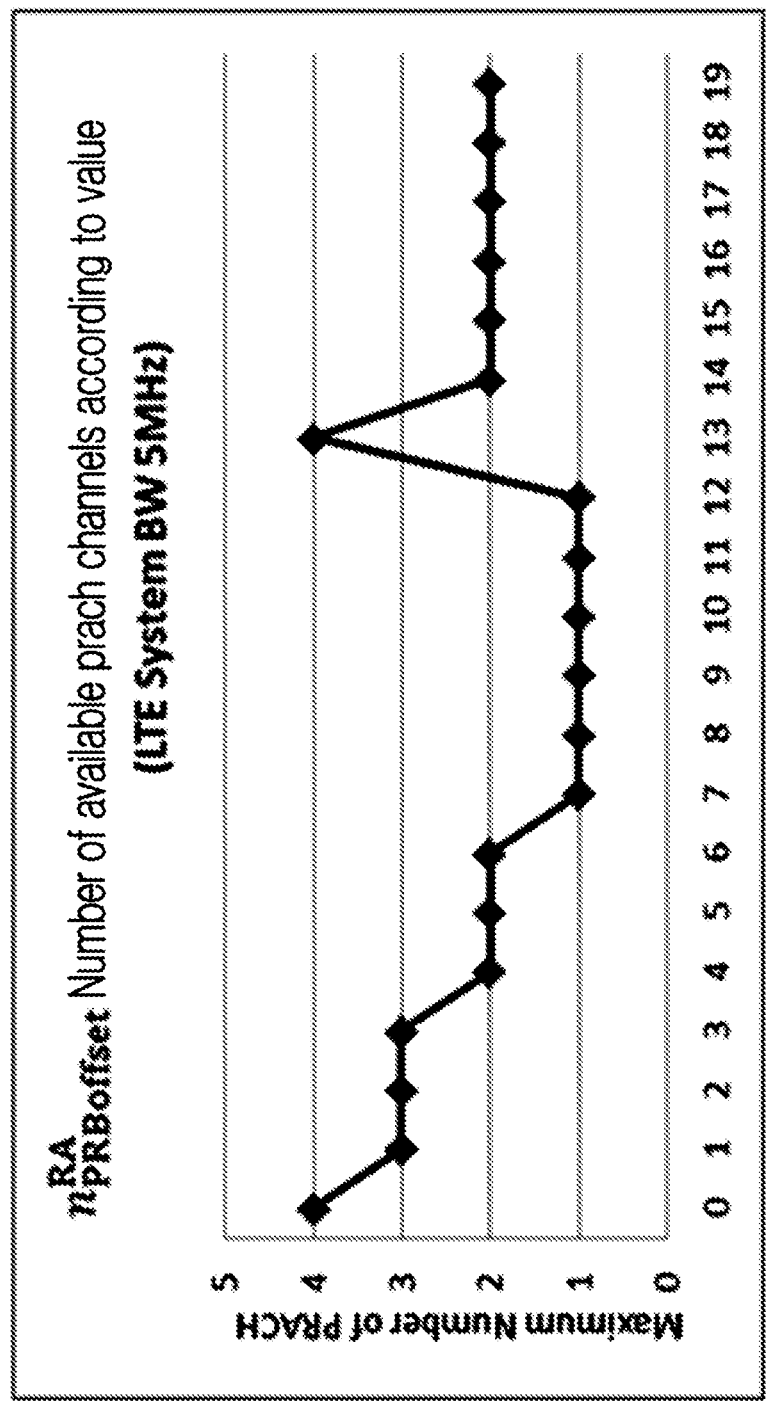
FIG. 11 is a view showing the number of available PRACHs with respect to a PRACH frequency offset value using Equation 1 when a system channel band is 5 MHz and $N_{RB}^{UL}$=25 in an LTE TDD mode.

FIG. 11 is a view showing the number of available PRACHs with respect to a value of $n_{PRBoffset}^{RA}$ using Equation 1 when a system channel band is 5 MHz and $N_{RB}^{UL}=25$ in an LTE TDD mode.

As shown in FIG. 11, in cases where the value of $n_{PRBoffset}^{RA}$ is in lower regions 0~12 and upper regions 13~24 of an RB index, there occurs problem that the number of available PRACHs has a non-symmetrical structure, and a case where the number of PRACHs is 3 ($f_{RA}=2$) may not be used when the value of $n_{PRBoffset}^{RA}$ is in the upper regions.

Table 3 shows an example of a LTE TDD PRACH configuration through time and frequency domain multiplexing. Table 3 is an example organizing PRACH radio resource mapping as an indicator (x,y,z,w) format using 4 types of parameters for multiplexing a plurality of PRACHs on a time domain and a frequency domain and transmitting a random access preamble.

TABLE 3

| PRACH configuration Index | uplink-downlink configuration | | | | | | | $R_{RA}$ |
|---|---|---|---|---|---|---|---|---|
| | 0 | 1 | 2 | 3 | 4 | 5 | 6 | |
| 0 | (0, 1, 0, 2) | (0, 1, 0, 1) | (0, 1, 0, 0) | (0, 1, 0, 2) | (0, 1, 0, 1) | (0, 1, 0, 0) | (0, 1, 0, 2) | 0 |
| 1 | (0, 2, 0, 2) | (0, 2, 0, 1) | (0, 2, 0, 0) | (0, 2, 0, 2) | (0, 2, 0, 1) | (0, 2, 0, 0) | (0, 2, 0, 2) | 1 |
| 2 | (0, 1, 1, 2) | (0, 1, 1, 1) | (0, 1, 1, 0) | (0, 1, 0, 1) | (0, 1, 0, 0) | N/A | (0, 1, 1, 1) | 2 |
| 3 | (0, 0, 0, 2) | (0, 0, 0, 1) | (0, 0, 0, 0) | (0, 0, 0, 1) | (0, 0, 0, 0) | (0, 0, 0, 1) | (0, 0, 0, 2) | 0 |
| 4 | (0, 0, 1, 2) | (0, 0, 1, 1) | (0, 0, 1, 0) | (0, 0, 0, 1) | (0, 0, 0, 0) | N/A | (0, 0, 1, 1) | 1 |
| 5 | (0, 0, 0, 1) | (0, 0, 0, 0) | N/A | (0, 0, 0, 0) | N/A | N/A | (0, 0, 0, 1) | 2 |
| 6 | (0, 0, 0, 2) | (0, 0, 0, 1) | (0, 0, 0, 0) | (0, 0, 0, 1) | (0, 0, 0, 0) | (0, 0, 0, 0) | (0, 0, 0, 2) | 0 |
| | (0, 0, 1, 2) | (0, 0, 1, 1) | (0, 0, 1, 0) | (0, 0, 0, 2) | (0, 0, 0, 1) | (1, 0, 0, 0) | (0, 0, 1, 1) | |
| 7 | (0, 0, 0, 1) | (0, 0, 0, 0) | N/A | (0, 0, 0, 0) | N/A | N/A | (0, 0, 0, 1) | 1 |
| | (0, 0, 1, 1) | (0, 0, 1, 0) | | (0, 0, 0, 2) | | | (0, 0, 1, 0) | |
| 8 | (0, 0, 0, 0) | N/A | N/A | (0, 0, 0, 0) | N/A | N/A | (0, 0, 0, 0) | 2 |
| | (0, 0, 1, 0) | | | (0, 0, 0, 1) | | | (0, 0, 1, 1) | |
| 9 | (0, 0, 0, 1) | (0, 0, 0, 0) | (0, 0, 0, 0) | (0, 0, 0, 0) | (0, 0, 0, 0) | (0, 0, 0, 0) | (0, 0, 0, 1) | 0 |
| | (0, 0, 0, 2) | (0, 0, 0, 1) | (0, 0, 1, 0) | (0, 0, 0, 1) | (0, 0, 0, 1) | (1, 0, 0, 0) | (0, 0, 0, 2) | |
| | (0, 0, 1, 2) | (0, 0, 1, 1) | (1, 0, 0, 0) | (0, 0, 0, 2) | (1, 0, 0, 1) | (2, 0, 0, 0) | (0, 0, 1, 1) | |
| 10 | (0, 0, 0, 0) | (0, 0, 0, 1) | (0, 0, 0, 0) | N/A | (0, 0, 0, 0) | N/A | (0, 0, 0, 0) | 1 |
| | (0, 0, 1, 0) | (0, 0, 1, 0) | (0, 0, 1, 0) | | (0, 0, 0, 1) | | (0, 0, 0, 2) | |
| | (0, 0, 1, 1) | (0, 0, 1, 1) | (1, 0, 1, 0) | | (1, 0, 0, 0) | | (0, 0, 1, 0) | |
| 11 | N/A | (0, 0, 0, 0) | N/A | N/A | N/A | N/A | (0, 0, 0, 1) | 2 |
| | | (0, 0, 0, 1) | | | | | (0, 0, 1, 0) | |
| | | (0, 0, 1, 0) | | | | | (0, 0, 1, 1) | |
| 12 | (0, 0, 0, 1) | (0, 0, 0, 0) | (0, 0, 0, 0) | (0, 0, 0, 0) | (0, 0, 0, 0) | (0, 0, 0, 0) | (0, 0, 0, 1) | 0 |
| | (0, 0, 0, 2) | (0, 0, 0, 1) | (0, 0, 1, 0) | (0, 0, 0, 1) | (0, 0, 0, 1) | (1, 0, 0, 0) | (0, 0, 0, 2) | |
| | (0, 0, 1, 1) | (0, 0, 1, 0) | (1, 0, 0, 0) | (0, 0, 0, 2) | (1, 0, 0, 0) | (2, 0, 0, 0) | (0, 0, 1, 0) | |
| | (0, 0, 1, 2) | (0, 0, 1, 1) | (1, 0, 1, 0) | (1, 0, 0, 0) | (1, 0, 0, 1) | (3, 0, 0, 0) | (0, 0, 1, 1) | |
| 13 | (0, 0, 0, 0) | N/A | N/A | (0, 0, 0, 0) | N/A | N/A | (0, 0, 0, 0) | 1 |
| | (0, 0, 0, 2) | | | (0, 0, 0, 1) | | | (0, 0, 0, 1) | |
| | (0, 0, 1, 0) | | | (0, 0, 0, 2) | | | (0, 0, 0, 2) | |
| | (0, 0, 1, 2) | | | (1, 0, 0, 1) | | | (0, 0, 1, 1) | |
| 14 | (0, 0, 0, 0) | N/A | N/A | (0, 0, 0, 0) | N/A | N/A | (0, 0, 0, 0) | 2 |
| | (0, 0, 0, 1) | | | (0, 0, 0, 1) | | | (0, 0, 0, 2) | |
| | (0, 0, 1, 0) | | | (0, 0, 0, 2) | | | (0, 0, 1, 0) | |
| | (0, 0, 1, 1) | | | (1, 0, 0, 0) | | | (0, 0, 1, 1) | |
| 15 | (0, 0, 0, 0) | (0, 0, 0, 0) | (0, 0, 0, 0) | (0, 0, 0, 0) | (0, 0, 0, 0) | (0, 0, 0, 0) | (0, 0, 0, 0) | 0 |
| | (0, 0, 0, 1) | (0, 0, 0, 1) | (0, 0, 1, 0) | (0, 0, 0, 1) | (0, 0, 0, 1) | (1, 0, 0, 0) | (0, 0, 0, 1) | |
| | (0, 0, 0, 2) | (0, 0, 1, 0) | (1, 0, 0, 0) | (0, 0, 0, 2) | (1, 0, 0, 0) | (2, 0, 0, 0) | (0, 0, 0, 2) | |
| | (0, 0, 1, 1) | (0, 0, 1, 1) | (1, 0, 1, 0) | (1, 0, 0, 1) | (1, 0, 0, 1) | (3, 0, 0, 0) | (0, 0, 1, 0) | |
| | (0, 0, 1, 2) | (1, 0, 0, 1) | (2, 0, 0, 0) | (1, 0, 0, 2) | (2, 0, 0, 0) | (4, 0, 0, 0) | (0, 0, 1, 1) | |
| 16 | (0, 0, 0, 1) | (0, 0, 0, 0) | (0, 0, 0, 0) | (0, 0, 0, 0) | (0, 0, 0, 0) | N/A | N/A | 1 |
| | (0, 0, 0, 2) | (0, 0, 0, 1) | (0, 0, 1, 0) | (0, 0, 0, 1) | (0, 0, 0, 1) | | | |
| | (0, 0, 1, 0) | (0, 0, 1, 0) | (1, 0, 0, 0) | (0, 0, 0, 2) | (1, 0, 0, 0) | | | |
| | (0, 0, 1, 1) | (0, 0, 1, 1) | (1, 0, 1, 0) | (1, 0, 0, 0) | (1, 0, 0, 1) | | | |
| | (0, 0, 1, 2) | (1, 0, 1, 1) | (2, 0, 1, 0) | (1, 0, 0, 2) | (2, 0, 0, 0) | | | |
| 17 | (0, 0, 0, 0) | (0, 0, 0, 0) | N/A | (0, 0, 0, 0) | N/A | N/A | N/A | 2 |
| | (0, 0, 0, 1) | (0, 0, 0, 1) | | (0, 0, 0, 1) | | | | |
| | (0, 0, 0, 2) | (0, 0, 1, 0) | | (0, 0, 0, 2) | | | | |
| | (0, 0, 1, 0) | (0, 0, 1, 1) | | (1, 0, 0, 0) | | | | |
| | (0, 0, 1, 2) | (1, 0, 0, 0) | | (1, 0, 0, 1) | | | | |
| 18 | (0, 0, 0, 0) | (0, 0, 0, 0) | (0, 0, 0, 0) | (0, 0, 0, 0) | (0, 0, 0, 0) | (0, 0, 0, 0) | (0, 0, 0, 0) | 0 |
| | (0, 0, 0, 1) | (0, 0, 0, 1) | (0, 0, 1, 0) | (0, 0, 0, 1) | (0, 0, 0, 1) | (1, 0, 0, 0) | (0, 0, 0, 1) | |
| | (0, 0, 0, 2) | (0, 0, 1, 0) | (1, 0, 0, 0) | (0, 0, 0, 2) | (1, 0, 0, 0) | (2, 0, 0, 0) | (0, 0, 0, 2) | |
| | (0, 0, 1, 0) | (0, 0, 1, 1) | (1, 0, 1, 0) | (1, 0, 0, 0) | (1, 0, 0, 1) | (3, 0, 0, 0) | (0, 0, 1, 0) | |
| | (0, 0, 1, 1) | (1, 0, 0, 1) | (2, 0, 0, 0) | (1, 0, 0, 1) | (2, 0, 0, 0) | (4, 0, 0, 0) | (0, 0, 1, 1) | |
| | (0, 0, 1, 2) | (1, 0, 1, 1) | (2, 0, 1, 0) | (1, 0, 0, 2) | (2, 0, 0, 1) | (5, 0, 0, 0) | (1, 0, 0, 2) | |
| 19 | N/A | (0, 0, 0, 0) | N/A | N/A | N/A | N/A | (0, 0, 0, 0) | 1 |
| | | (0, 0, 0, 1) | | | | | (0, 0, 0, 1) | |
| | | (0, 0, 1, 0) | | | | | (0, 0, 0, 2) | |
| | | (0, 0, 1, 1) | | | | | (0, 0, 1, 0) | |
| | | (1, 0, 0, 0) | | | | | (0, 0, 1, 1) | |
| | | (1, 0, 1, 0) | | | | | (1, 0, 1, 1) | |

In the indicators (x,y,z,w) shown in Table 3, x denotes one frequency domain parameter, and y, z and w denote time domain parameters.

x denotes $f_{RA}$ that is a frequency resource index. y, z, w respectively denote indicators $t_{RA}^{(0)}$, $t_{RA}^{(1)}$, $t_{RA}^{(2)}$. In this regard, $t_{RA}^{(0)}$=0,1,2 means that random access resources for PRACHs are respectively allocated to every radio frame or every even or odd radio frame, and $t_{RA}^{(1)}$=0,1 means that random access resources for PRACHs are respectively located in a first part (front part) or a second part (back part) of a half frame. $t_{RA}^{(2)}$ means a subframe index at which a random access preamble starts. 0 indicates a first uplink subframe between subframes at which turning points of downlink and uplink are located.

Further, uplink-downlink configurations relate to a frame structure of a TDD method and indicate the frame structure according to a configuration ratio of downlink subframes and uplink subframes. An index of the frame structure according to the configuration ratio of downlink subframes and uplink subframes, i.e., an uplink-downlink configuration index, is shown in Table 4. Table 4 shows an example of TDD uplink-downlink configurations. In this regard, D denotes a subframe at which a downlink transmission is performed, U denotes a subframe at which a downlink transmission is performed, S denotes a special subframe at which uplink and downlink are switched and includes a downlink pilot transmission slot (DwPTS), a switching gap, and an uplink pilot transmission slot (UpPTS).

TABLE 4

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As described above, a PRACH is configured, and thus a random access process is performed by starting a random access preamble transmission.

Then, a method of configuring frequency domain resources of PRACHs that prevents an RB hole from being generated even if a value of $n_{PRBoffset}^{RA}$ is in a lower region or an upper region of an RB index will be described in detail below.

The method of configuring frequency domain resources of the PRACHs according to an exemplary embodiment of the present invention differently determines RB indexes $n_{PRB}^{RA}$ to which the PRACHs are allocated according to the value of $n_{PRBoffset}^{RA}$ that is in a lower region or an upper region of a frequency domain with respect to $N_{RB}^{UL}$ by using $N_{RB}^{UL}$, $f_{RA}$, and $n_{PRBoffset}^{RA}$ and performs PRACH multiplexing in the frequency domain.

In the method of configuring frequency domain resources of the PRACHs according to an exemplary embodiment of the present invention, when a plurality of PRACHs are allocated even if the value of $n_{PRBoffset}^{RA}$ is set as the upper region or the lower region, RBs to which the PRACHs are allocated are symmetrically located in relation to a center RB.

The method of configuring frequency domain resources of the PRACHs according to an exemplary embodiment of the present invention is a method of determining the RB index $n_{PRB}^{RA}$ to which the PRACHs are allocated for frequency domain channel multiplexing. The method of determining the RB index $n_{PRB}^{RA}$ is determined according to Equation 2 below.

$$n_{PRB}^{RA} = \begin{cases} n_{PRBoffset}^{RA} + N_{RB}^{RA} R_{PRBoffset}^{RA}(f_{RA}/2), & \text{if } f_{RA} \bmod 2 = 0 \\ N_{RB}^{UL} - N_{RB}^{RA} - (n_{PRBoffset}^{RA} + N_{RB}^{RA} R_{PRBoffset}^{RA}(\text{floor}(f_{RA}/2))), & \text{otherwise} \end{cases}$$

(Equation 2)

In Equation 2, floor(x) returns a largest integer among integers smaller than or equal to a parameter x. $f_{RA}$ means a frequency resource index of PRACHs identified through frequency domain multiplexing. The frequency resource index of PRACHs starts from 0 within the number of available PRACHs as many as possible in a cell. $N_{RB}^{RA}$ indicates the number of RBs occupied by each random access premable, i.e. one PRACH, and is 6 in, for example, the LTE. Therefore, a PRACH frequency offset $n_{PRBoffset}^{RA}$ that is an index of RB notified by an upper layer for PRACH transmission is set within a range of $0 \leq n_{PRBoffset}^{RA} \leq N_{RB}^{UL} - N_{RB}^{RA}$. $R_{PRBoffset}^{RA}$ indicates an indication value indicating whether a value of $n_{PRBoffset}^{RA}$ is in an upper region or a lower region within an available uplink channel frequency band range and is determined according to Equation 3.

$$R_{PRBoffset}^{RA} = \begin{cases} 1, & \text{if } n_{PRBoffset}^{RA} < N_{RB}^{UL}/2 \\ -1, & \text{otherwise} \end{cases}$$

(Equation 3)

That is, if it is satisfied that $n_{PRBoffset}^{RA} < N_{RB}^{UL}/2$, the value of $n_{PRBoffset}^{RA}$ is in the upper region within the available uplink channel frequency band range, and $n_{PRBoffset}^{RA}$=1. If it is satisfied that $n_{PRBoffset}^{RA} \geq N_{RB}^{UL}/2$ the value of $n_{PRBoffset}^{RA}$ is in the lower region within the uplink channel frequency band range, and $R_{PRBoffset}^{RA}$=-1.

Figure 12A:
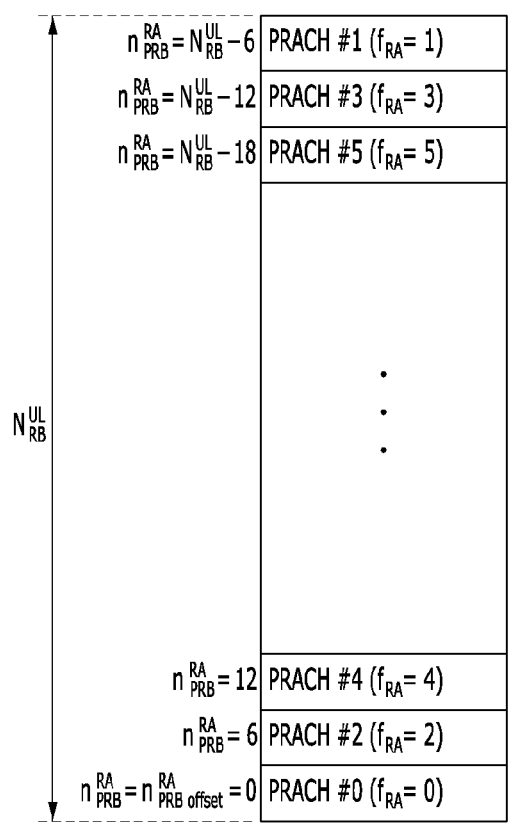
FIGS. 12A through 12C are views showing examples of allocating PRACHs to uplink subframes according to Equation 2 when a PRACH frequency offset value is in a lower region within an uplink channel frequency band range in an LTE TDD mode according to an exemplary embodiment of the present invention.
Figure 12B:
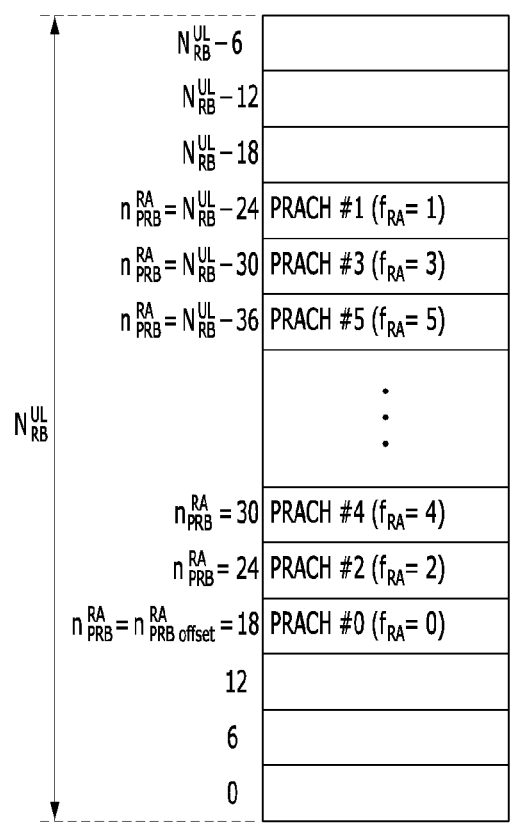
Figure 12C:
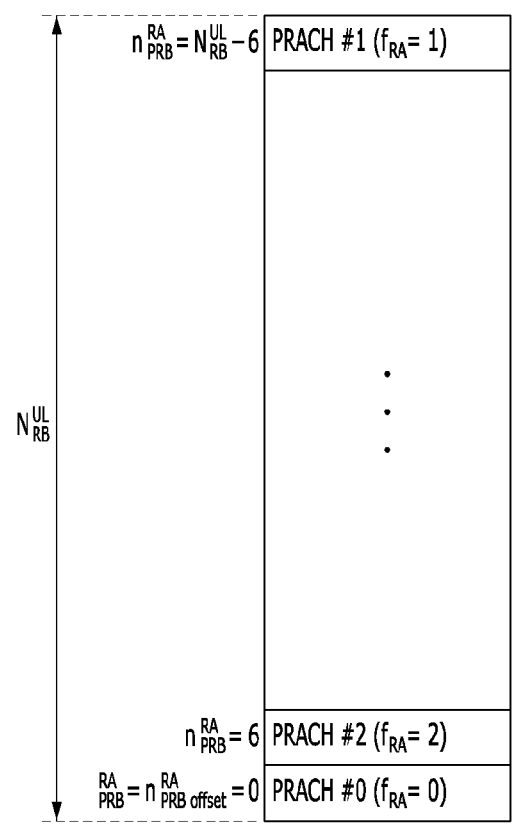

FIGS. 12A through 12C are views showing examples of allocating PRACHs to uplink subframes according to Equation 2 when a value of $n_{PRBoffset}^{RA}$ is in a lower region within an uplink channel frequency band range in an LTE TDD mode according to an exemplary embodiment of the present invention.

FIG. 12A shows a case where an offset value designating a location of a first PRACH is $n_{PRBoffset}^{RA}$ ($f_{RA}$=0), and a maximum number of available PRACHs is 6, and thus shows a layout structure of PRACHs when $f_{RA}$ is 0, 1, 2, 3, 4, 5.

As shown in FIG. 12A, according to Equation 2, PRACH #0 having 0 as an index of $f_{RA}$ is allocated to the lowermost location corresponding to an RB index 0 in a frequency domain corresponding to $N_{RB}^{UL}$, and PRACH #1 having 1 as the index of $f_{RA}$ is allocated to the uppermost location corresponding to an RB index $N_{RB}^{UL}-6$. PRACH #2 having 2 as the index of $f_{RA}$ is allocated to a location corresponding to an RB index 6, and PRACH #3 having 3 as the index of $f_{RA}$ is allocated to a location corresponding to an RB index $N_{RB}^{UL}-12$. PRACH #4 having 4 as the index of $f_{RA}$ is allocated to a location corresponding to an RB index 12, and PRACH #5 having 5 as the index of $f_{RA}$ is allocated to a location corresponding to an RB index $N_{RB}^{UL}-18$. In doing so, RB locations to which PRACHs are allocated according to the index of $f_{RA}$ are symmetrical to each other in relation to a center RB.

FIG. 12B shows a case where $n_{PRBoffset}^{RA}=18$ ($f_{RA}=0$) and a maximum number of available PRACHs is 6, and thus shows a layout structure of PRACHs when $f_{RA}$ is 0, 1, 2, 3, 4, 5.

As shown in FIG. 12B, according to Equation 2, PRACH #0 having 0 as the index of $f_{RA}$ is allocated to a location corresponding to an RB index 18 in the frequency domain corresponding to $N_{RB}^{UL}$, and PRACH #1 having 1 as the index of $f_{RA}$ is allocated to a location corresponding to an RB index $N_{RB}^{UL}-24$. PRACH #2 having 2 as the index of $f_{RA}$ is allocated to a location corresponding to an RB index 24, and PRACH #3 having 3 as the index of $f_{RA}$ is allocated to a location corresponding to an RB index $N_{RB}^{UL}-30$. PRACH #4 having 4 as the index of $f_{RA}$ is allocated to a location corresponding to an RB index 30, and PRACH #5 having 5 as the index of $f_{RA}$ is allocated to a location corresponding to an RB index $N_{RB}^{UL}-36$. In doing so, RB locations to which PRACHs are allocated according to the index of $f_{RA}$ are symmetrical to each other in relation to the center RB.

FIG. 12C shows a case where $n_{PRBoffset}^{RA}=N_{RB}^{UL}-12$ ($f_{RA}=0$) and a maximum number of available PRACHs is 6 while a maximum value of $f_{RA}$ is 2, and thus shows a layout structure of PRACHs when $f_{RA}$ is 0, 1, 2.

According to Equation 2, since $n_{PRB}^{RA}$ of the first PRACH is 0, PRACH #0 having 0 as the index of $f_{RA}$ is allocated to the lowermost location corresponding to the RB index 0 in the frequency domain corresponding to $N_{RB}^{UL}$. According to Equation 2, PRACH #1 having 1 as the index of $f_{RA}$ is allocated to the uppermost location corresponding to the RB index $N_{RB}^{UL}-6$, and PRACH #2 having 2 as the index of $f_{RA}$ is allocated to a location corresponding to the RB index 6.

Figure 13B:
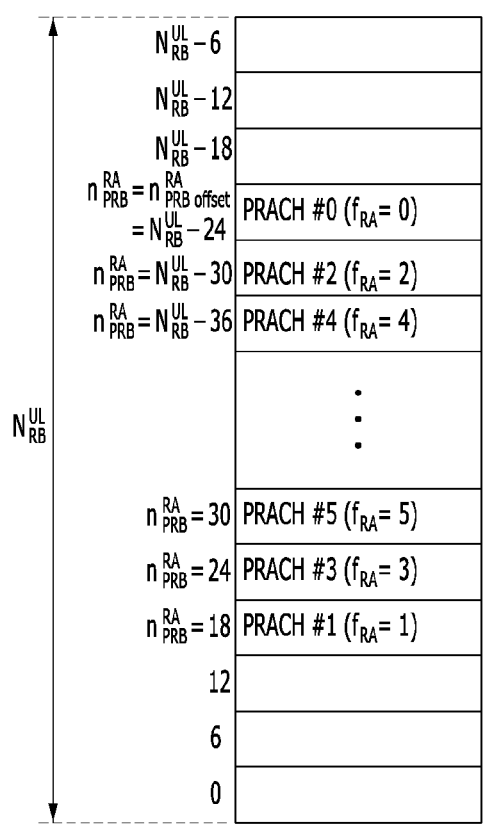
Figure 13C:
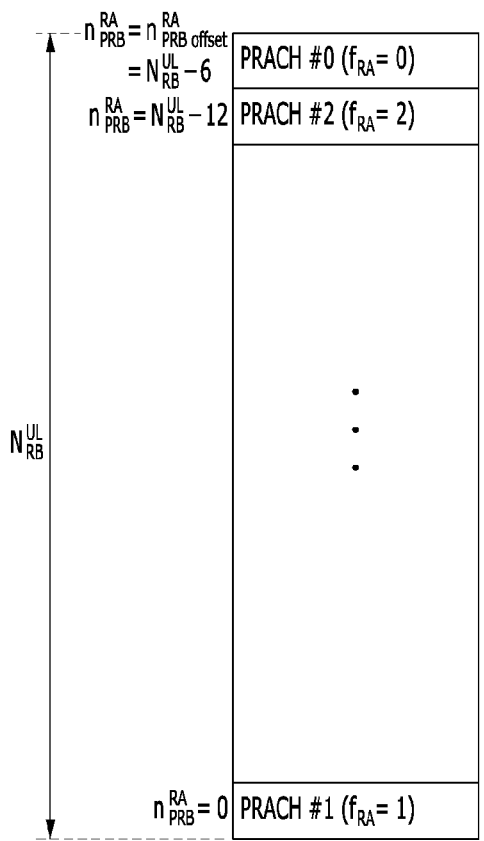

FIGS. 13A through 13C are views showing examples of allocating PRACHs to uplink subframes according to Equation 2 when a value of $n_{PRBoffset}^{RA}$ is in an upper region within an uplink channel frequency band range in an LTE TDD mode according to an exemplary embodiment of the present invention.

FIG. 13A shows a case where an offset value designating a location of a first PRACH is $n_{PRBoffset}^{RA}=N_{RB}^{UL}-6$ ($f_{RA}=0$), and a maximum number of available PRACHs is 6, and thus shows a layout structure of PRACHs when $f_{RA}$ is 0, 1, 2, 3, 4, 5.

As shown in FIG. 13A, according to Equation 2, PRACH #0 having 0 as an index of $f_{RA}$ is allocated to the uppermost location corresponding to an RB index $N_{RB}^{UL}-6$ in a frequency domain corresponding to $N_{RB}^{UL}$, and PRACH #1 having 1 as the index of $f_{RA}$ is allocated to the lowermost location corresponding to an RB index 0. PRACH #2 having 2 as the index of $f_{RA}$ is allocated to a location corresponding to an RB index $N_{RB}^{UL}-12$, and PRACH #3 having 3 as the index of $f_{RA}$ is allocated to a location corresponding to an RB index 6. PRACH #4 having 4 as the index of $f_{RA}$ is allocated to the uppermost location corresponding to an RB index $N_{RB}^{UL}-18$, and PRACH #5 having 5 as the index of $f_{RA}$ is allocated to a location corresponding to an RB index 12. In doing so, RB locations to which PRACHs are allocated according to the index of $f_{RA}$ are symmetrical to each other in relation to a center RB.

FIG. 13B shows a case where $n_{PRBoffset}^{RA}=N_{RB}^{UL}-24$ ($f_{RA}=0$) and a maximum number of available PRACHs is 6, and thus shows a layout structure of PRACHs when $f_{RA}$ is 0, 1, 2, 3, 4, 5.

As shown in FIG. 13B, according to Equation 2, PRACH #0 having 0 as the index of $f_{RA}$ is allocated to a location corresponding to an RB index $N_{RB}^{UL}-24$ in the frequency domain corresponding to $N_{RB}^{UL}$, and PRACH #1 having 1 as the index of $f_{RA}$ is allocated to a location corresponding to an RB index 18 according to Equation 1. PRACH #2 having 2 as the index of $f_{RA}$ is allocated to a location corresponding to an RB index $N_{RB}^{UL}-30$, and PRACH #3 having 3 as the index of $f_{RA}$ is allocated to a location corresponding to an RB index 24. PRACH #4 having 4 as the index of $f_{RA}$ is allocated to a location corresponding to an RB index $N_{RB}^{UL}-36$, and PRACH #5 having 5 as the index of $f_{RA}$ is allocated to a location corresponding to an RB index 30. In doing so, RB locations of PRACHs are symmetrical to each other in relation to the center RB according to the index of $f_{RA}$.

FIG. 13C shows a case where $n_{PRBoffset}^{RA}=N_{RB}^{UL}-6$ ($f_{RA}=0$) and a maximum number of available PRACHs is 6 while a maximum value of $f_{RA}$ is 2, and thus shows a layout structure of PRACHs when $f_{RA}$ is 0, 1, 2.

As shown in FIG. 13C, according to Equation 2, PRACH #0 having 0 as the index of $f_{RA}$ is allocated to the uppermost location corresponding to the RB index $N_{RB}^{UL}-6$, PRACH #1 having 1 as the index of $f_{RA}$ is allocated to the lowermost location corresponding to the RB index 0, and PRACH #2 having 2 as the index of $f_{RA}$ is allocated to a location corresponding to the RB index $N_{RB}^{UL}-12$.

Referring to FIG. 13C, although a maximum number of available PRACHs is 6, even if only three PRACHs are allocated, no RB hole is generated, unlike FIG. 8C.

As described above, in the method of configuring the frequency domain resources of the PRACHs according to an exemplary embodiment of the present invention based on Equation 2, no RB hole is generated, and thus RBs may be continuously allocated in the data traffic transmission, and an RB hole is removed, thereby enabling an efficient operation of radio resources.

If the frequency domain resources of the PRACHs are configured based on Equation 2, in cases where the value of $n_{PRBoffset}^{RA}$ is in the lower region or the upper region, when the same number of PRACHs is configured, since the occupied RB locations are symmetrical to each other according to the $f_{RA}$ index, it is easy to assign and manage a PRACH configuration version of each cell.

Figure 14:
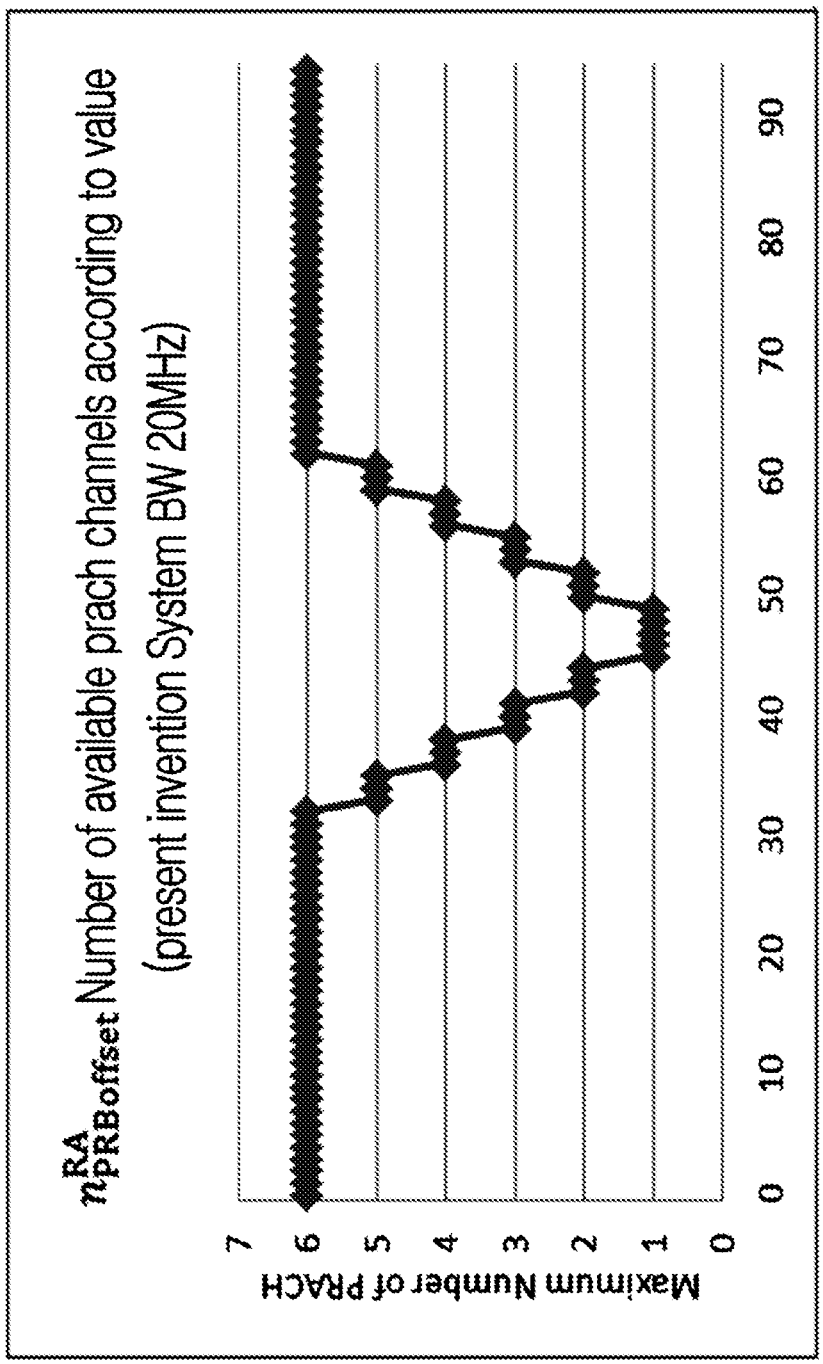
FIG. 14 to FIG. 16 are views showing the number of available PRACHs with respect to a PRACH frequency offset value in an LTE TDD mode when Equation 2 is used as a method of configuring frequency domain resources of PRACHs according to an exemplary embodiment of the present invention.

FIG. 14 is a view showing the number of available PRACHs with respect to a value of $n_{PRBoffset}^{RA}$ in an LTE TDD mode when Equation 2 is used as a method of configuring frequency domain resources of PRACHs according to an exemplary embodiment of the present invention and shows a case where a system channel band is 20 MHz, and $N_{RB}^{UL}-100$.

As shown in FIG. 14, in cases where a value of $n_{PRBoffset}^{RA}$ is in lower regions 0~49 and upper regions 50~99 of an RB index, the number of available PRACHs has a perfect symmetrical structure, and a case where the number of PRACHs is 3 ($f_{RA}=2$), 5($f_{RA}=4$) may be used when the value of $n_{PRBoffset}^{RA}$ is in the upper regions, unlike FIG. 9.

Figure 15:
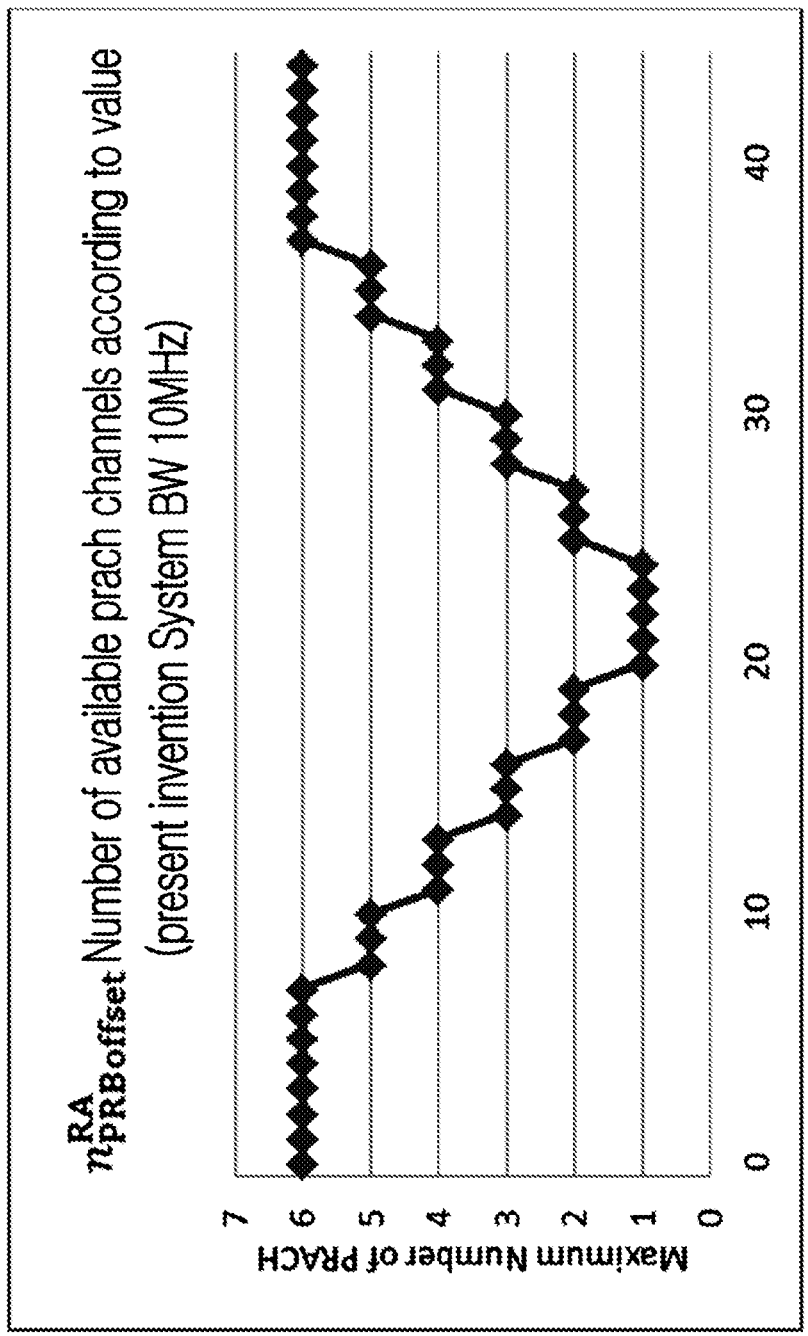

FIG. 15 is a view showing the number of available PRACHs with respect to a value of $n_{PRBoffset}^{RA}$ in an LTE TDD mode when Equation 2 is used as a method of configuring frequency domain resources of PRACHs according to an exemplary embodiment of the present invention and shows a case where a system channel band is 10 MHz, and $N_{RB}^{UL}$–50.

As shown in FIG. 15, in cases where the value of $n_{PRBoffset}^{RA}$ is in lower regions 0~24 and upper regions 25~49 of an RB index, the number of available PRACHs has a perfect symmetrical structure, and a case where the number of PRACHs is 3 ($f_{RA}$=2), 5($f_{RA}$=4) may be used when the value of $n_{PRBoffset}^{RA}$ is in the upper regions, unlike FIG. 10.

Figure 16:
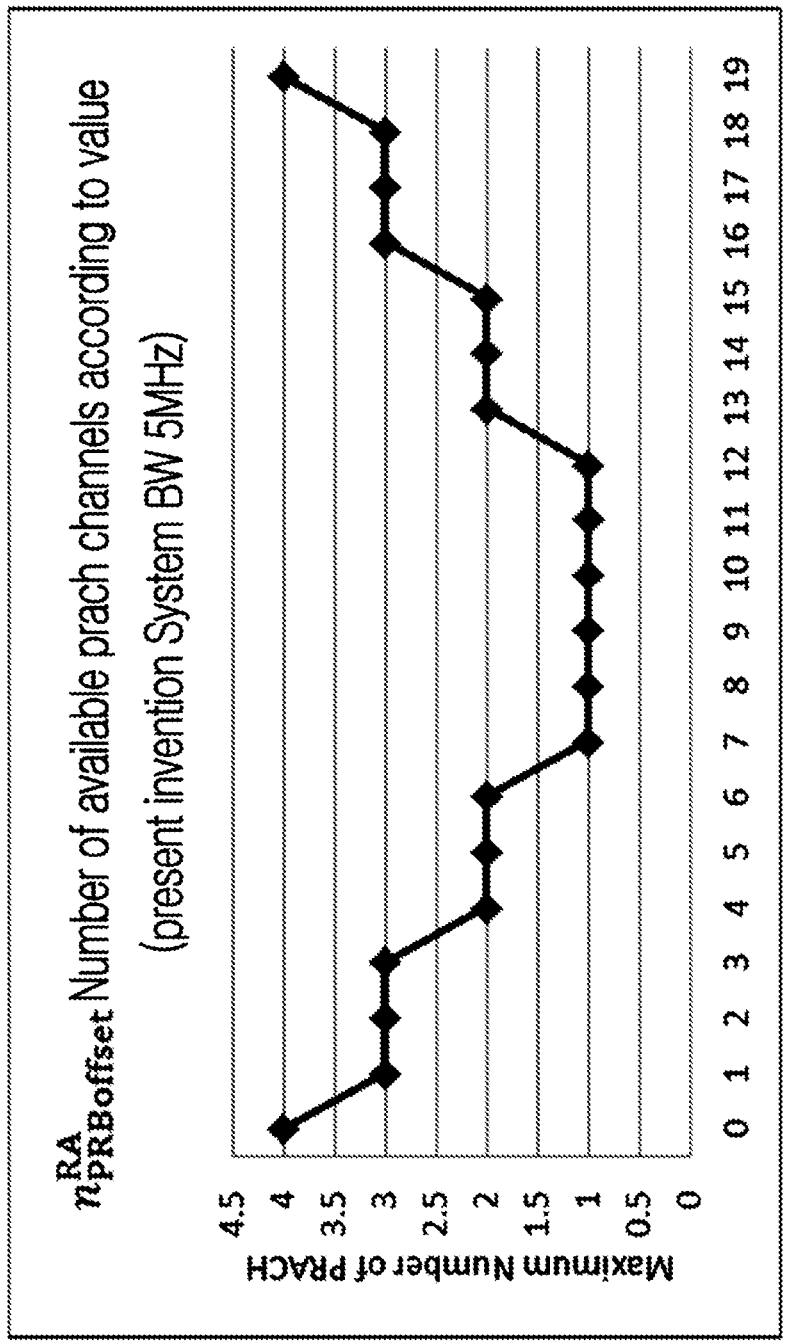

FIG. 16 is a view showing the number of available PRACHs with respect to a value of $n_{PRBoffset}^{RA}$ in an LTE TDD mode when Equation 2 is used as a method of configuring frequency domain resources of PRACHs according to an exemplary embodiment of the present invention and shows a case where a system channel band is 5 MHz, and $N_{RB}^{UL}$–25.

As shown in FIG. 16, in cases where the value of $n_{PRBoffset}^{RA}$ is in lower regions 0~12 and upper regions 13~24 of an RB index, the number of available PRACHs has a perfect symmetrical structure, and a case where the number of PRACHs is 3 ($f_{RA}$=2) may be used when the value of $n_{PRBoffset}^{RA}$ is in the upper regions, unlike FIG. 11.

Furthermore, a PRACH may be reconfigured by applying time and frequency domain multiplexing in different PRACH configuration versions to the method of configuring the frequency domain resources according to an exemplary embodiment of the present invention. Time and frequency domain multiplexing may use four types of parameters (x, y, z, w) like Table 3. In this case, when different cells have the same TDD frame structure while configuring the same number of random access channels, interference between random access channels in cells may be avoided using different PRACH configuration versions.

The method of configuring the frequency domain resources described above may be used to configure a system to which a more effective random access process is applied.

For example, a value of $n_{PRBoffset}^{RA}$ is in a lower region or an upper region as shown in FIG. 12A though 13C, PRACHs are disposed by differentiating versions between cells as shown in FIG. 6, and PRACHs are configured through time and frequency domain multiplexing as shown in Table 3, thereby effectively reducing interference between PRACHs that may occur during random access preamble transmission, increasing a random access success probability, and obtaining an effect of uniformly distributing processing load of PRACHs to several cells.

Figure 17:
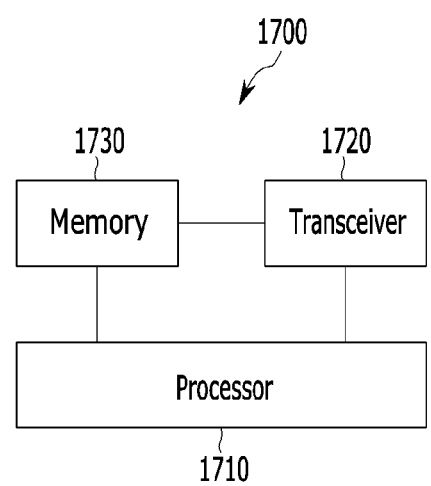
FIG. 17 is a view showing an apparatus for configuring resources of a random access channel according to an exemplary embodiment of the present invention.

FIG. 17 is a view showing an apparatus 1700 for configuring resources of a random access channel according to an exemplary embodiment of the present invention.

Referring to FIG. 17, the apparatus 1700 for configuring resources of the random access channel includes a processor 1710, a transceiver 1720, and a memory 1730. The apparatus 1700 for configuring resources of the random access channel may be implemented in a base station.

The processor 1710 determines values of RB index to which PRACHs are allocated through Equation 2 such that RBs of the PRACHs that are random access channels in an available uplink RB may have a symmetrical structure and allocates the PRACHs to locations corresponding to the determined RB index. When different cells have the same TDD frame structure while configuring the same number of PRACHs, the processor 1710 performs time domain and frequency domain multiplexing using different PRACH configuration versions and reconfigures the PRACHs in order to avoid interference of PRACHs between cells.

The transceiver 1720 transmits/receives data or a signal to/from a terminal

In particular, the transceiver 1720 transmits/receives resource configuration information of PRACHs to all terminals located in cells.

The memory 1730 stores instructions for frequency domain resource configuration of PRACHs in the processor 1710 or loads or temporally stores instructions from a storage device (not shown). The processor 1710 executes the instructions stored in the memory 1730 or the loaded instructions.

The processor 1710 and the memory 1730 may be connected to each other via a bus (not shown). An input/output interface (not shown) may be connected to the bus. In this regard, the transceiver 1720 is connected to the input/output interface and a peripheral device such as an input device, a display, a speaker, a storage device, etc. may be connected to the input/output interface.

According to an exemplary embodiment of the present invention, a frequency domain radio resource configuration with respect to PRACHs is disposed in an intuitive structure, thereby facilitating a random access channel configuration in different cells, reducing interference between different adjacent cells of a preamble signal transmitted through an uplink PRACH, and increasing a success probability of random access, and thus reliability of a system may be increased.

The exemplary embodiments of the present invention described above are not implemented through only the apparatus and/or the method described above, but may also be implemented through programs executing functions corresponding to configurations of the exemplary embodiments of the present invention, a recording medium in which the programs are recorded, and the like. In addition, these implementations may be easily made by those skilled in the art to which the present invention pertains from the exemplary embodiments described above.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of configuring frequency domain resources of a random access channel in a base station of a wireless communication system, the method comprising:

determining an indicator value indicating a location of an offset value designating a location of a first random access channel among a plurality of random access channels;

determining an index of radio resource blocks to which the plurality of random access channels are allocated by using the offset value, the indicator value, and a frequency resource index of each of the plurality of random access channels such that the radio resource blocks of the plurality of random access channels are symmetrical to each other in available uplink radio resource blocks, using an equation; and allocating the plurality of random access channels to locations corresponding to the determined index of the radio resource blocks;

wherein a distribution of a number of the plurality of random access channels, when the location of the offset value is an upper region of indices of available uplink radio resource blocks, is symmetrical with a distribution of a number of the plurality of random access channels when the location of the offset value is a lower region of the indices of the available uplink radio resource blocks,
and the equation is $$n_{PRB}^{RA} = \begin{cases} n_{PRBoffset}^{RA} + N_{RB}^{RA} R_{PRBoffset}^{RA}(f_{RA}/2), & \text{if } f_{RA} \bmod 2 = 0 \\ N_{RB}^{UL} - N_{RB}^{RA} - (n_{PRBoffset}^{RA} + N_{RB}^{RA} R_{PRBoffset}^{RA} (\text{floor}(f_{RA}/2))), & \text{otherwise} \end{cases}$$

wherein floor(x) returns a largest integer among integers smaller than or equal to a parameter x, fRA denotes the frequency resource index of each of the random access channels, $N_{RB}^{RA}$ denotes a number of radio resource blocks occupied by one random access channel, $n_{PRBoffset}^{RA}$ denotes the offset value, $ER_{PRBoffset}^{RA}$ denotes the indicator value, and $n_{PRB}^{RA}$ denotes the index of the radio resource blocks.

2. The method of claim 1, wherein
the indicator value indicates whether the offset value is in the upper region or the lower region in relation to a center radio resource block among the available uplink radio resource blocks.

3. The method of claim 2, wherein the indicator value has a value of 1 or −1 according to the location of the offset value.

4. The method of claim 1, wherein
the indicator value is 1 when the location of the offset value is in the upper region in relation to a center radio resource block among the available uplink radio resource blocks, and is −1 when the location of the offset value is in a lower region in relation to the center radio resource block.

5. The method of claim 1, wherein
the determining further includes: receiving the offset value from an upper layer.

6. The method of claim 1, further comprising:
when random access channels having a same number as that of adjacent cells are configured and have a same frame structure, differently allocating the plurality of random access channels in the adjacent cells and a time domain.

7. An apparatus for configuring frequency domain resources of a random access channel in a wireless communication system, the apparatus comprising:
a processor determining radio resource blocks to which a plurality of random access channels are allocated such that the radio resource blocks of the plurality of random access channels are symmetrical to each other in relation to a center radio resource block in available uplink radio resource blocks, and determining an index of the available uplink radio resource blocks to which the plurality of random access channels are allocated, by using an offset value designating a location of a first random access channel among the plurality of random access channels, an indicator value indicating a location of the offset value, and a frequency resource index of each of the plurality of random access channels, by using an equation; and
a transceiver transmitting resource configuration information of the plurality of random access channels to all terminals included in a cell;
wherein a distribution of a number of the plurality of random access channels, when the location of the offset value is an upper region of indices of available uplink radio resource blocks, is symmetrical with a distribution of a number of the plurality of random access channels when the location of the offset value is a lower region of the indices of the available uplink radio resource blocks,
and the equation is $$n_{PRB}^{RA} = \begin{cases} n_{PRBoffset}^{RA} + N_{RB}^{RA} R_{PRBoffset}^{RA}(f_{RA}/2), & \text{if } f_{RA} \bmod 2 = 0 \\ N_{RB}^{UL} - N_{RB}^{RA} - (n_{PRBoffset}^{RA} + N_{RB}^{RA} R_{PRBoffset}^{RA} (\text{floor}(f_{RA}/2))), & \text{otherwise} \end{cases}$$

wherein floor(x) returns a largest integer among integers smaller than or equal to a parameter x, fRA denotes the frequency resource index of random access channels, $N_{RB}^{RA}$ denotes a number of radio resource blocks occupied by one random access channel, $n_{PRBoffset}^{RA}$ denotes the offset value, $R_{PRBoffset}^{RA}$ denotes the indicator value, and $n_{PRB}^{RA}$ denotes the index of the uplink radio resource blocks.

8. The apparatus of claim 7, wherein
the indicator value has a value of 1 or −1 according to whether the offset value is in the upper region or the lower region in relation to the center radio resource block among the available uplink radio resource blocks.

9. The apparatus of claim 7, wherein
the indicator value is 1 when the location of the offset value is in the upper region in relation to the center radio resource block among the available uplink radio resource blocks, and is −1 when the location of the offset value is in the lower region in relation to the center radio resource block.

10. The apparatus of claim 7, wherein
when random access channels having a same number as those of adjacent cells are configured and have a same frame structure, the processor differently allocates the plurality of random access channels in the adjacent cells and a time domain.

11. The apparatus of claim 10, wherein
locations of the plurality of random access channels in a time domain includes a first indicator, a second indicator, and a third indicator,
wherein the first indicator indicates one of each radio frame, an even radio frame, and an odd radio frame, the second indicator indicates a front part of a half frame or a back part of the half frame, and the third indicator indicates a subframe index at which a random access preamble starts.

* * * * *